US012750363B2

(12) United States Patent
Gormley et al.

(10) Patent No.: US 12,750,363 B2
(45) Date of Patent: Sep. 29, 2026

(54) BIOMETRIC-BASED AUTHORIZATION

(71) Applicant: The Toronto-Dominion Bank, Toronto (CA)

(72) Inventors: Breena Patricia Gormley, Toronto (CA); Ana Isabel Almeida Pacheco, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 29 days.

(21) Appl. No.: 18/934,273

(22) Filed: Nov. 1, 2024

(65) Prior Publication Data

US 2026/0129041 A1 May 7, 2026

(51) Int. Cl.

*H04L 9/40* (2022.01)
*G06F 21/31* (2013.01)
*H04L 9/32* (2006.01)

(52) U.S. Cl.

CPC .......... *H04L 63/0861* (2013.01); *G06F 21/31* (2013.01); *H04L 9/3231* (2013.01); *H04L 63/126* (2013.01); *H04L 63/14* (2013.01); *H04L 63/16* (2013.01)

(58) Field of Classification Search

CPC ..... H04L 63/08; H04L 63/0861; H04L 63/12; H04L 63/126; H04L 63/14; H04L 63/16; H04L 63/162; H04L 63/166; H04L 9/32; H04L 9/3231; G06F 21/30; G06F 21/31; G06F 21/32; H04W 12/06; H04W 12/062

See application file for complete search history.

(56) References Cited

U.S. PATENT DOCUMENTS

| | | | |
|---|---|---|---|
| 9,864,982 | B2 | 1/2018 | Bristow et al. |
| 10,163,085 | B2 | 12/2018 | D'Agostino et al. |
| 10,169,760 | B2 | 1/2019 | Pourfallah et al. |
| 10,178,246 | B1 | 1/2019 | Horvath et al. |
| 10,181,114 | B2 | 1/2019 | Tseretopoulos et al. |
| 10,339,931 | B2 | 7/2019 | Tseretopoulos et al. |
| 10,346,824 | B2 | 7/2019 | Chan et al. |
| 10,360,303 | B2 | 7/2019 | Volkovs et al. |
| 10,380,587 | B2 | 8/2019 | Kimberg et al. |
| 10,405,146 | B1 | 9/2019 | Kuruvilla et al. |
| 10,438,206 | B2 | 10/2019 | Jivraj et al. |

(Continued)

OTHER PUBLICATIONS

Heglin et al., "Auto-Adjudication Process Via Machine Learning," U.S. Appl. No. 19/053,942, filed Feb. 14, 2025.

*Primary Examiner* — Shaqueal D Wade-Wright

(57) ABSTRACT

An example operation may include receiving an authorization request message from a computer network, the authorization request message comprising details of a data transfer from a sender to a receiver, dynamically determining a type of biometric to be used to verify the sender, receiving biometric data of the type of biometric from the sender based on an input via a software application, obtaining baseline biometric data of the sender from a database, verifying an identity of the sender, and in response to successful verification of the identity of the sender, modifying the authorization request message to indicate the identity of the sender is verified, transmitting the modified authorization request message to a computing node in the computer network to perform the data transfer and the operation may further include an AI chatbot or an AI agent that performs an action based on the modified authorization request message.

20 Claims, 19 Drawing Sheets

(56) References Cited

U.S. PATENT DOCUMENTS 10,440,196 B2 10/2019 Horvath et al.
10,440,197 B2 10/2019 Horvath et al.
10,460,748 B2 10/2019 Tseretopoulos et al.
10,482,675 B1 11/2019 Sutter et al.
10,659,400 B2 5/2020 Moon et al.
10,681,024 B2 * 6/2020 Badri ...................... H04L 63/06
10,698,902 B2 6/2020 Tseretopoulos et al.
10,706,635 B2 7/2020 Sutter et al.
10,708,721 B2 7/2020 Kuruvilla et al.
10,728,259 B2 7/2020 McCarter et al.
10,776,619 B2 9/2020 Collinson et al.
10,824,941 B2 11/2020 Volkovs et al.
10,831,923 B2 11/2020 Dunjic et al.
10,832,047 B2 11/2020 Moghtadai
10,862,897 B2 12/2020 D'Agostino et al.
10,867,292 B2 12/2020 Lin et al.
10,867,293 B2 12/2020 Bristow et al.
10,878,816 B2 12/2020 Tseretopoulos et al.
10,902,220 B2 1/2021 Lozon et al.
10,922,665 B2 2/2021 Miller et al.
10,943,605 B2 3/2021 Tseretopoulos et al.
10,977,617 B2 4/2021 Tseretopoulos et al.
11,004,187 B2 5/2021 Kuruvilla et al.
11,017,028 B2 5/2021 Dunjic et al.
11,030,415 B2 6/2021 Volkovs et al.
11,055,924 B2 7/2021 Navarro et al.
11,061,638 B2 7/2021 Lam
11,070,448 B2 7/2021 Miller et al.
11,087,314 B2 8/2021 Gandhi et al.
11,100,168 B2 8/2021 Miller et al.
11,132,683 B2 9/2021 Kumnick et al.
11,140,143 B2 10/2021 Moon et al.
11,144,921 B2 10/2021 Dunjic et al.
11,144,998 B2 10/2021 Kuruvilla et al.
11,145,169 B2 10/2021 Pratten et al.
11,182,860 B2 11/2021 Kuruvilla et al.
11,200,328 B2 12/2021 Shpurov et al.
11,200,411 B2 12/2021 Rizvi et al.
11,210,857 B2 12/2021 Rizvi et al.
11,222,286 B2 1/2022 Choe et al.
11,232,304 B2 1/2022 Navarro et al.
11,276,257 B2 3/2022 Moghtadai et al.
11,303,642 B2 4/2022 Dunjic et al.
11,315,116 B2 * 4/2022 Goldschmidt ....... G06Q 20/202
11,334,574 B2 5/2022 Caputo et al.
11,347,744 B2 5/2022 Tseretopoulos et al.
11,349,871 B2 5/2022 Moon et al.
11,354,442 B2 6/2022 Haldenby et al.
11,361,566 B2 6/2022 Collinson et al.
11,373,229 B2 6/2022 Tseretopoulos et al.
11,392,776 B2 7/2022 Lozon et al.
11,393,020 B2 7/2022 Mathew et al.
11,394,668 B1 7/2022 Subbunarayanan et al.
11,397,765 B2 7/2022 Volkovs et al.
11,409,811 B2 8/2022 D'Agostino
11,411,734 B2 8/2022 Shpurov et al.
11,430,242 B2 8/2022 Moghtadai
11,436,809 B2 9/2022 Rizvi et al.
11,451,669 B1 9/2022 Navarro et al.
11,469,878 B2 10/2022 Shpurov et al.
11,470,091 B2 10/2022 McCarter et al.
11,470,143 B2 10/2022 Joheb et al.
11,475,059 B2 10/2022 Liu et al.
11,475,251 B2 10/2022 Morin et al.
11,477,265 B2 10/2022 McPhee et al.
11,507,622 B2 11/2022 Grebenisan et al.
11,507,868 B2 11/2022 Kwong et al.
11,546,345 B2 1/2023 D'Agostino et al.
11,580,762 B2 2/2023 Rizvi et al.
11,600,064 B2 3/2023 Navarro et al.
11,604,899 B2 3/2023 Haldenby et al.
11,620,741 B2 4/2023 Kuruvilla et al.
11,632,311 B2 4/2023 Miller et al.
11,651,100 B2 5/2023 Dunjic et al.
11,663,488 B2 5/2023 Volkovs et al.
11,671,536 B2 6/2023 Navarro et al.
11,687,995 B2 6/2023 Tseretopoulos et al.
11,689,484 B2 6/2023 Moon et al.
11,704,782 B2 7/2023 Wakim et al.
11,741,305 B2 8/2023 Skaljin et al.
11,743,210 B2 8/2023 Moon et al.
11,748,400 B2 9/2023 Volkovs et al.
11,756,388 B2 9/2023 Pratten et al.
11,777,918 B2 10/2023 Moon et al.
11,782,935 B2 10/2023 Caputo et al.
11,789,909 B2 10/2023 Grebenisan et al.
11,790,012 B2 10/2023 D'Agostino
11,790,354 B2 10/2023 Gandhi et al.
11,797,962 B2 10/2023 Jones et al.
11,809,486 B2 11/2023 Liu et al.
11,809,577 B2 11/2023 Begg et al.
11,811,826 B2 11/2023 Moon et al.
11,842,252 B2 12/2023 Kuang et al.
11,875,398 B2 1/2024 Pratten et al.
11,880,811 B2 1/2024 Pawelkiewicz et al.
11,886,764 B2 1/2024 Lam
11,928,112 B2 3/2024 Dunjic et al.
11,941,525 B2 3/2024 Morin et al.
11,941,703 B2 3/2024 Kuruvilla et al.
11,955,117 B2 4/2024 McDermid et al.
11,966,491 B2 4/2024 D'Agostino
11,978,085 B2 5/2024 Rai et al.
11,978,090 B2 5/2024 Navarro et al.
11,985,153 B2 5/2024 Karl
11,995,121 B2 5/2024 Volkovs et al.
12,008,315 B2 6/2024 Miller et al.
12,014,303 B2 6/2024 Carvalho et al.
12,019,594 B2 6/2024 Floyd et al.
12,021,874 B2 6/2024 Dunjic et al.
12,039,535 B2 7/2024 Dunjic et al.
12,052,363 B2 7/2024 Shpurov et al.
12,061,652 B2 8/2024 Miller et al.
12,067,130 B2 8/2024 Shpurov et al.
12,067,580 B2 8/2024 Jeske et al.
12,079,351 B2 9/2024 Begg et al.
12,106,220 B2 10/2024 Volkovs et al.
12,111,793 B2 10/2024 Grebenisan et al.
12,124,925 B2 10/2024 Rho et al.
12,136,079 B2 11/2024 Jones et al.
12,164,542 B1 12/2024 Rahman et al.
12,169,693 B2 12/2024 Lu
12,182,800 B2 12/2024 Navarro et al.
12,198,109 B2 1/2025 Abbas
12,198,510 B2 1/2025 Pratten et al.
12,210,534 B2 1/2025 Cashion et al.
12,211,274 B2 1/2025 Ma et al.
12,217,011 B2 2/2025 Luo et al.
12,223,549 B2 2/2025 Bouëtté et al.
12,229,690 B2 2/2025 Stanevich et al.
12,254,512 B2 3/2025 Heglin et al.
12,282,785 B2 4/2025 Karbasi et al.
12,288,236 B2 4/2025 Volkovs et al.
12,299,149 B2 5/2025 Nikoghossian et al.
12,316,715 B2 5/2025 Taheri et al.
12,321,861 B2 6/2025 Volkovs et al.
12,326,856 B2 6/2025 Mohammed et al.
12,333,354 B2 6/2025 Mohammed et al.
12,353,969 B2 7/2025 Kuang et al.
12,354,094 B2 7/2025 Jones et al.
12,373,795 B2 7/2025 Misler et al.
12,452,142 B2 * 10/2025 Syed Muhammad ....................... H04W 72/543
12,625,994 B2 * 5/2026 Grover ................ G06F 21/6218
2017/0357981 A1 * 12/2017 Azzam ............... G06Q 20/4016
2018/0268818 A1 9/2018 Schoenmackers et al.
2019/0172045 A1 6/2019 Dunjic et al.
2019/0306142 A1 10/2019 Gujral et al.
2020/0058068 A1 2/2020 Gandhi et al.
2020/0279270 A1 9/2020 Lieberman et al.
2021/0027160 A1 1/2021 Volkovs et al.
2021/0037040 A1 2/2021 Aleks et al.
2021/0044584 A1 * 2/2021 Rajakumar ......... H04L 63/0861
2021/0117893 A1 4/2021 Sohum et al.
2021/0232950 A1 7/2021 Kono

(56) References Cited

U.S. PATENT DOCUMENTS

2021/0264461 A1 8/2021 Fam
2021/0406905 A1 12/2021 Kumnick et al.
2021/0407016 A1 12/2021 Kuruvilla et al.
2022/0058489 A1 2/2022 Volkovs et al.
2022/0108069 A1 4/2022 Lee
2022/0157094 A1 5/2022 Moghtadai et al.
2022/0172083 A1 6/2022 Wu et al.
2022/0188705 A1 6/2022 Davoodi et al.
2022/0198411 A1 6/2022 Jones et al.
2022/0198432 A1 6/2022 Jones et al.
2022/0198445 A1 6/2022 Jones et al.
2022/0207295 A1 6/2022 Stanevich et al.
2022/0207430 A1 6/2022 Dickie et al.
2022/0207432 A1 6/2022 Whelan et al.
2022/0207606 A1 6/2022 Dickie et al.
2022/0209952 A1* 6/2022 Rapolu ................ H04L 9/3213
2022/0245060 A1 8/2022 Kathuria et al.
2022/0270155 A1 8/2022 Volkovs et al.
2022/0277213 A1 9/2022 Braviner et al.
2022/0277227 A1 9/2022 Yu et al.
2022/0277323 A1 9/2022 Whelan et al.
2022/0284450 A1 9/2022 Asta et al.
2022/0292504 A1 9/2022 Sukhija et al.
2022/0300903 A1 9/2022 Huang et al.
2022/0309573 A1 9/2022 Mathew et al.
2022/0318573 A1 10/2022 Smith et al.
2022/0318617 A1 10/2022 Wong et al.
2022/0327397 A1 10/2022 Braviner et al.
2022/0327430 A1 10/2022 Zuberi et al.
2022/0327431 A1 10/2022 Braviner et al.
2022/0327432 A1 10/2022 Gutierrez Bugarin et al.
2022/0327625 A1 10/2022 Leung et al.
2022/0335718 A1 10/2022 Ma et al.
2022/0343422 A1 10/2022 Zuberi et al.
2022/0366064 A1 11/2022 Nikoghossian et al.
2022/0383301 A1 12/2022 Jones et al.
2022/0383313 A1 12/2022 Jones et al.
2022/0383314 A1 12/2022 Jones et al.
2022/0405299 A1 12/2022 Leung et al.
2022/0414495 A1 12/2022 Stanevich et al.
2023/0006809 A1 1/2023 Shpurov et al.
2023/0007075 A1 1/2023 Mcphee et al.
2023/0011451 A1 1/2023 Lu
2023/0048437 A1 2/2023 Karbasi et al.
2023/0083899 A1 3/2023 Gandouet et al.
2023/0086653 A1 3/2023 Zykh et al.
2023/0107703 A1 4/2023 Zhang et al.
2023/0113752 A1 4/2023 Jorlett et al.
2023/0119108 A1 4/2023 Volkovs et al.
2023/0131935 A1 4/2023 Volkovs et al.
2023/0153461 A1 5/2023 Kalra et al.
2023/0195734 A1 6/2023 Cashion et al.
2023/0196406 A1 6/2023 Gandouet et al.
2023/0244917 A1 8/2023 Loaiza Ganem et al.
2023/0244962 A1 8/2023 Volkovs et al.
2023/0252301 A1 8/2023 Volkovs et al.
2023/0259883 A1 8/2023 Misler et al.
2023/0267367 A1 8/2023 Volkovs et al.
2023/0267475 A1 8/2023 Navarro et al.
2023/0306434 A1 9/2023 Dunjic et al.
2023/0316485 A1 10/2023 Wakim et al.
2023/0318994 A1 10/2023 Moon et al.
2023/0336615 A1 10/2023 Joheb et al.
2023/0342481 A1 10/2023 Nikoghossian et al.
2023/0344814 A1 10/2023 Moon et al.
2023/0351116 A1 11/2023 Skaljin et al.
2023/0368048 A1 11/2023 Yang et al.
2023/0377047 A1 11/2023 Bouëtté et al.
2023/0385693 A1 11/2023 Cresswell et al.
2023/0385694 A1 11/2023 Cresswell et al.
2023/0386190 A1 11/2023 Cresswell et al.
2023/0394452 A1 12/2023 Jones et al.
2023/0401192 A1 12/2023 Yang et al.
2023/0401553 A1 12/2023 Navarro et al.
2023/0401572 A1 12/2023 Navarro et al.
2023/0419302 A1 12/2023 Navarro et al.
2023/0419402 A1 12/2023 Ghelichi et al.
2024/0020534 A1 1/2024 Perez Vallejo et al.
2024/0062117 A1 2/2024 Kuang et al.
2024/0106851 A1 3/2024 Kennedy et al.
2024/0119346 A1 4/2024 Chang et al.
2024/0126575 A1 4/2024 Kiriakou et al.
2024/0127036 A1 4/2024 Zuberi et al.
2024/0127214 A1 4/2024 Wander et al.
2024/0193562 A1 6/2024 Pratten et al.
2024/0202756 A1 6/2024 Karl et al.
2024/0203405 A1 6/2024 McDermid et al.
2024/0211732 A1 6/2024 Wander et al.
2024/0212049 A1 6/2024 Ghelichi et al.
2024/0220653 A1 7/2024 D'Agostino
2024/0232614 A1 7/2024 Esmaeili et al.
2024/0232950 A1 7/2024 Navarro et al.
2024/0249310 A1 7/2024 Rai et al.
2024/0256903 A1 8/2024 Ens et al.
2024/0256904 A1 8/2024 Leung et al.
2024/0256968 A1 8/2024 Hosseinzadeh et al.
2024/0265055 A1 8/2024 Purkayastha
2024/0281467 A1 8/2024 Volkovs et al.
2024/0281808 A1 8/2024 Vouitsis et al.
2024/0281818 A1 8/2024 Golestan Irani et al.
2024/0289645 A1 8/2024 Makhijani et al.
2024/0289876 A1 8/2024 Mathew et al.
2024/0303551 A1 9/2024 Li et al.
2024/0304182 A1 9/2024 Hamilton et al.
2024/0330772 A1 10/2024 Cresswell et al.
2024/0330809 A1 10/2024 Carvalho et al.
2024/0338520 A1 10/2024 Misler et al.
2024/0346338 A1 10/2024 Desai et al.
2024/0370880 A1 11/2024 Jeske et al.
2024/0370881 A1 11/2024 Jeske et al.
2024/0385838 A1 11/2024 Yu et al.
2024/0386295 A1 11/2024 Yu et al.
2024/0386325 A1 11/2024 Yu et al.
2024/0386326 A1 11/2024 Yu et al.
2024/0386427 A1 11/2024 Abbas et al.
2024/0394569 A1 11/2024 Farhadi Hassan Kiadeh et al.
2024/0394588 A1 11/2024 Heglan et al.
2024/0403702 A1 12/2024 Deljavan Farshi
2024/0403862 A1 12/2024 Abbas et al.
2024/0412069 A1 12/2024 Volkovs et al.
2024/0412078 A1 12/2024 Ghelichi et al.
2024/0412083 A1 12/2024 Starszyk et al.
2024/0419978 A1 12/2024 Stein et al.
2024/0420010 A1 12/2024 Cirulis et al.
2024/0420011 A1 12/2024 Cirulis et al.
2024/0428283 A1 12/2024 Belbahri et al.
2025/0013363 A1 1/2025 Estoesta et al.
2025/0013697 A1 1/2025 Estoesta et al.
2025/0013927 A1 1/2025 Rho et al.
2025/0014010 A1 1/2025 Jones et al.
2025/0014052 A1 1/2025 Bhattacharjee et al.
2025/0028852 A1 1/2025 Chowanski et al.
2025/0028934 A1 1/2025 Wong et al.
2025/0029012 A1 1/2025 Rho et al.
2025/0045601 A1 2/2025 Zuberi et al.
2025/0053387 A1 2/2025 Wang et al.
2025/0068646 A1 2/2025 Rahman et al.
2025/0068853 A1 2/2025 Lu
2025/0069063 A1 2/2025 Navarro et al.
2025/0077187 A1 3/2025 Guttridge et al.
2025/0077188 A1 3/2025 Guttridge et al.
2025/0077189 A1 3/2025 Guttridge et al.
2025/0077190 A1 3/2025 Guttridge et al.
2025/0077204 A1 3/2025 Guttridge et al.
2025/0077227 A1 3/2025 Guttridge et al.
2025/0077396 A1 3/2025 Sen
2025/0077397 A1 3/2025 Sen
2025/0077399 A1 3/2025 Sen
2025/0077400 A1 3/2025 Sen
2025/0077556 A1 3/2025 Guttridge et al.
2025/0077681 A1 3/2025 Sen
2025/0077682 A1 3/2025 Guttridge et al.
2025/0077939 A1 3/2025 Tabatabaei et al.
2025/0078324 A1 3/2025 Gormley

(56) References Cited

U.S. PATENT DOCUMENTS

2025/0078325 A1 3/2025 Gormley
2025/0078344 A1 3/2025 Gormley
2025/0078345 A1 3/2025 Gormley
2025/0078972 A1 3/2025 Gormley
2025/0085936 A1 3/2025 Guttridge et al.
2025/0086096 A1 3/2025 Guttridge et al.
2025/0086440 A1 3/2025 Erb et al.
2025/0086441 A1 3/2025 Guttridge et al.
2025/0086451 A1 3/2025 Guttridge et al.
2025/0086551 A1 3/2025 Zhao
2025/0094437 A1 3/2025 Upendran
2025/0103609 A1 3/2025 Upendran
2025/0103961 A1 3/2025 Cresswell et al.
2025/0103980 A1 3/2025 Deljavan Farshi et al.
2025/0104024 A1 3/2025 Abbas
2025/0104029 A1 3/2025 Deljavan Farshi et al.
2025/0104047 A1 3/2025 Mashkevich
2025/0104050 A1 3/2025 Mashkevich
2025/0104059 A1 3/2025 Mashkevich
2025/0104074 A1 3/2025 Tsang et al.
2025/0104306 A1 3/2025 Mashkevich
2025/0104700 A1 3/2025 Henault-Ethier et al.
2025/0106060 A1 3/2025 Gormley et al.
2025/0106201 A1 3/2025 Gormley
2025/0110805 A1 4/2025 Starszyk et al.
2025/0117411 A1 4/2025 Mohammed
2025/0117595 A1 4/2025 Taheri
2025/0117596 A1 4/2025 Taheri
2025/0117623 A1 4/2025 Devarajan et al.
2025/0117629 A1 4/2025 Pandey et al.
2025/0117630 A1 4/2025 Taheri
2025/0117769 A1 4/2025 Taheri
2025/0117836 A1 4/2025 Taheri et al.
2025/0117853 A1 4/2025 Pandey et al.
2025/0117854 A1 4/2025 Pandey et al.
2025/0117855 A1 4/2025 Pandey et al.
2025/0117856 A1 4/2025 Pandey et al.
2025/0119396 A1 4/2025 Taheri
2025/0119494 A1 4/2025 Pandey et al.
2025/0119495 A1 4/2025 Pandey et al.
2025/0124039 A1 4/2025 Cashion et al.
2025/0124240 A1 4/2025 Luo et al.
2025/0131718 A1 4/2025 Ma et al.
2025/0138838 A1 5/2025 Ramesh et al.
2025/0139267 A1 5/2025 Zykh et al.
2025/0139382 A1 5/2025 Mohammed et al.
2025/0139708 A1 5/2025 Bouëtté et al.
2025/0147733 A1 5/2025 Abbas et al.
2025/0148321 A1 5/2025 Stanevich et al.
2025/0165375 A1 5/2025 Cresswell et al.
2025/0165866 A1 5/2025 Cresswell et al.
2025/0173170 A1 5/2025 Glynn-Udrow et al.
2025/0173568 A1 5/2025 Cresswell et al.
2025/0173618 A1 5/2025 Cresswell et al.
2025/0173619 A1 5/2025 Cresswell et al.
2025/0173725 A1 5/2025 Devarajan et al.
2025/0181321 A1 6/2025 Gormley
2025/0182028 A1 6/2025 Gormley
2025/0182196 A1 6/2025 Gormley
2025/0182222 A1 6/2025 Gormley
2025/0191062 A1 6/2025 Heglin et al.
2025/0217175 A1 7/2025 Karbasi et al.
2025/0225560 A1 7/2025 Bajaj et al.
2025/0231668 A1 7/2025 Tao et al.
2025/0231750 A1 7/2025 Lim et al.
2025/0231774 A1 7/2025 Tao et al.
2025/0231775 A1 7/2025 Tao et al.
2025/0231793 A1 7/2025 Lim et al.
2025/0232130 A1 7/2025 Tao et al.
2025/0232351 A1 7/2025 Tao et al.
2025/0232375 A1 7/2025 Tao et al.
2025/0232376 A1 7/2025 Tao et al.
2025/0232377 A1 7/2025 Tao et al.
2025/0232503 A1 7/2025 Lim et al.
2025/0238536 A1 7/2025 Nikoghossian et al.
2025/0245071 A1 7/2025 Ionescu et al.
2025/0245511 A1 7/2025 D'Agostino et al.

* cited by examiner

200B

400A

400B

400C

500C

500D

500E

600

610

710

BIOMETRIC-BASED AUTHORIZATION

BACKGROUND

Digital signatures (also referred to as electronic signatures or e-signatures) are generally considered more secure than wet signatures. A digital signature added to a digital document may rely on encryption and cryptographic algorithms to secure electronically signed documents, guaranteeing their integrity, authenticity, and non-repudiation. These cryptographic techniques create a digital "fingerprint" of the document, making any alterations detectable, thus bolstering trust and confidence in digital transactions. However, a digital signature can be stolen through various means including phishing, hacking, manipulating, or otherwise stealing the digital signature. Once the digital signature is stolen, it can be used by the thief to forge the digital signature on documents such as deeds, purchases of sale, and the like.

SUMMARY

One example embodiment provides an apparatus that includes a memory communicatively coupled to a processor, wherein the processor may at least one of receive document content from a software application, the document content including a digital document with a digital signature of a user embedded therein, dynamically determine at least one type of biometric to be used to verify the user based on the document content, receive biometric data of the at least one type of biometric from a device of the user based on an input via the software application, identify a baseline biometric data and digital signature verification data associated with the software application based on a unique identifier of the software application, verify the biometric data based on a comparison of the biometric data to the baseline biometric data and verify the digital signature based on the digital signature verification data, and in response to verification of the biometric data and the digital signature, edit the digital document to indicate the digital document is validly signed.

Another example embodiment provides a method that includes at least one of receiving document content from a software application, the document content including a digital document with a digital signature of a user embedded therein, dynamically determining at least one type of biometric to verify the user based on the document content, receiving biometric data of the at least one type of biometric from a device of the user based on an input via the software application, identifying a baseline biometric data and digital signature verification data associated with the software application based on a unique identifier of the software application, verifying the biometric data based on a comparison of the biometric data to the baseline biometric data and verifying the digital signature based on the digital signature verification data, and in response to verifying the biometric data and the digital signature, editing the digital document to indicate the digital document is validly signed.

A further example embodiment provides a computer readable storage medium comprising instructions, that when read by a processor, cause the processor to perform at least one of receiving document content from a software application, the document content including a digital document with a digital signature of a user embedded therein, dynamically determining at least one type of biometric to verify the user based on the document content, receiving biometric data of the at least one type of biometric from a device of the user based on an input via the software application, identifying a baseline biometric data and digital signature verification data associated with the software application based on a unique identifier of the software application, verifying the biometric data based on a comparison of the biometric data to the baseline biometric data and verifying the digital signature based on the digital signature verification data, and in response to verifying the biometric data and the digital signature, editing the digital document to indicate the digital document is validly signed.

Another example embodiment provides an apparatus that includes a memory communicatively coupled to a processor, wherein the processor may at least one of receive an authorization request message from a computer network, the authorization request message comprising details of a data transfer from a sender to a receiver, dynamically determine at least one type of biometric to be used to verify the sender based on the details of the data transfer, receive biometric data of the at least one type of biometric from the sender based on an input via a software application, obtain baseline biometric data of the sender from a database, verify an identity of the sender based on a comparison of the biometric data and the baseline biometric data, and in response to successful verification of the identity of the sender, modify the authorization request message to indicate the identity of the sender is verified, and transmit the modified authorization request message to a computing node in the computer network to perform the data transfer.

And yet another example embodiment provides a method that includes at least one of receiving an authorization request message from a computer network, the authorization request message comprising details of a data transfer from a sender to a receiver, dynamically determining at least one type of biometric to be used to verify the sender based on the details of the data transfer, receiving biometric data of the at least one type of biometric from the sender based on an input via a software application, obtaining baseline biometric data of the sender from a database, verifying an identity of the sender based on a comparison of the biometric data and the baseline biometric data, and in response to successful verification of the identity of the sender, modifying the authorization request message to indicate the identity of the sender is verified, and transmitting the modified authorization request message to a computing node in the computer network to perform the data transfer.

A further example embodiment provides a computer readable storage medium comprising instructions, that when read by a processor, cause the processor to perform at least one of receiving an authorization request message from a computer network, the authorization request message comprising details of a data transfer from a sender to a receiver, dynamically determining at least one type of biometric to be used to verify the sender based on the details of the data transfer, receiving biometric data of the at least one type of biometric from the sender based on an input via a software application, obtaining baseline biometric data of the sender from a database, verifying an identity of the sender based on a comparison of the biometric data and the baseline biometric data, and in response to successful verification of the identity of the sender, modifying the authorization request message to indicate the identity of the sender is verified, and transmitting the modified authorization request message to a computing node in the computer network to perform the data transfer.

DETAILED DESCRIPTION

Figure 1:
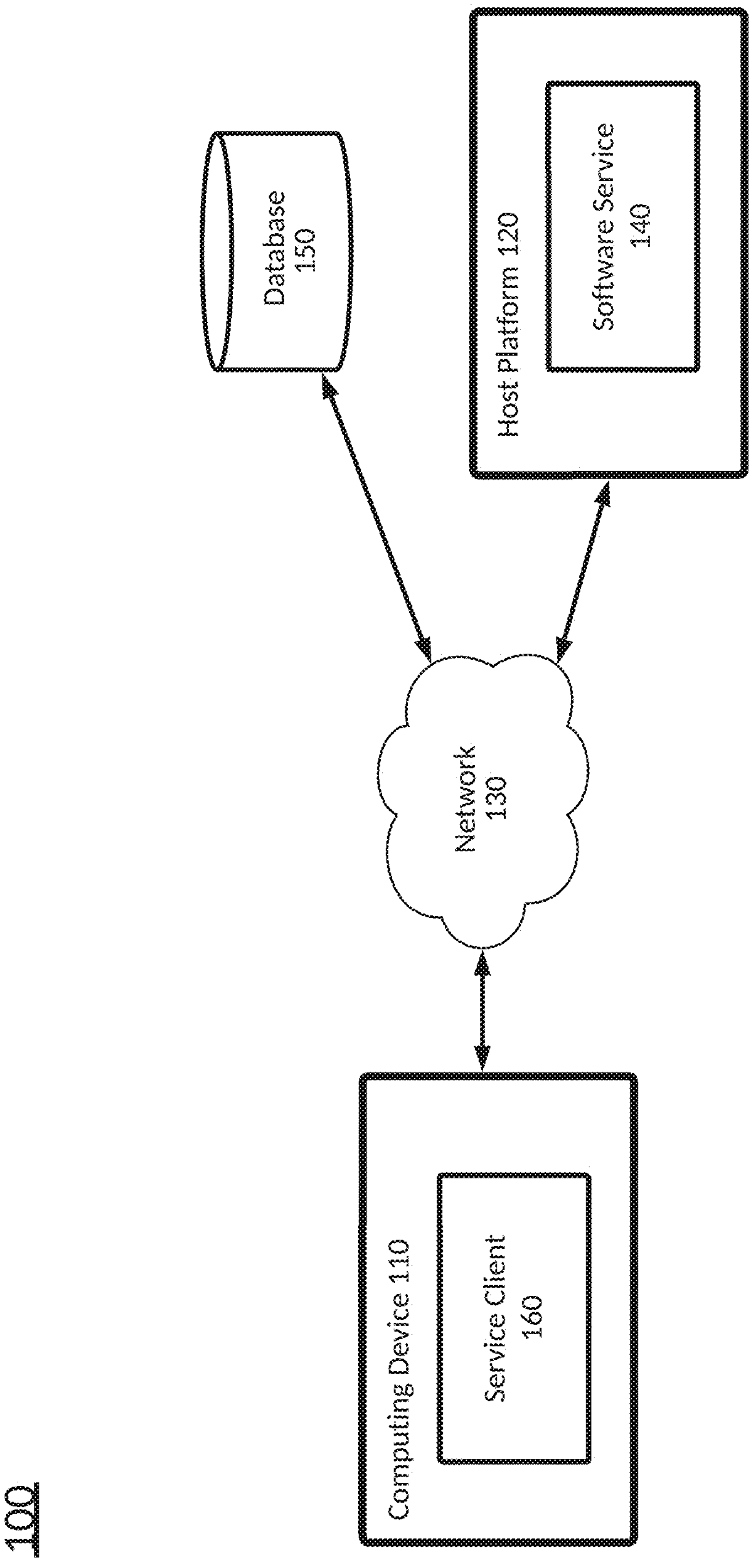
FIG. 1 is a system diagram illustrating an operating environment of a software service according to examples and features of the instant solution.

The examples and features of the instant solution are directed to a verification process for a digital signature. For example, a user (sender) may use their device, such as a smartphone, desktop computer, laptop, etc. to digitally sign an electronic document. The digital signature may be generated by the user by drawing the signature on the document (e.g., pressing on the screen, using a cursor, etc.). When this occurs, the software generates a hash of the electronic document using a predefined hash function and then encrypts the hash with a private key of the user which is known by the user and stored on their device. The encrypted hash is then sent to a verification system. The verification system may decrypt the hashed document using a corresponding public key of the user and generate its own local hash of the document. If the two hashes match, the signature is determined to be valid.

However, this process is not very secure. To further enhance this process, in the example of the instant solution, a biometric reading of the user is captured by the user's device along with the digital signature. The biometric data may include a fingerprint, a face scan, a brain wave scan, a biological sample with genetic code (e.g., deoxyribonucleic acid (DNA) sample), etc. and may be attached to the signed document. Both the signed document and the biometric data may be sent to the system described herein. In some examples and features of the instant solution, the user device may also transmit a baseline biometric data of the user that is previously registered on the user device. When the system receives the digitally signed document with the biometric data, the system may verify the digital signature through traditional means (e.g., by decrypting the encrypted hash of the document using a public key of the sender, generating a local hash of the document with the same hash function, and comparing the two hashes to make sure they match). In addition, the system may also verify that the signature is valid by comparing the biometric data to baseline biometric data of the user. When both the signature and the biometric data are verified, the system may mark the signed digital document as valid, for example, by placing a ribbon on the digital document or editing the digital document in some other manner.

Over time, a user's biometric data (e.g., fingerprint, retina scan, brain wave, etc.) may change as the user ages. To address this issue, in the examples and features of the instant solution, when a digital signature is validated through the use of newly-submitted biometric data, the system can "update" the baseline biometric data with the newly-submitted biometric data. Over time, the biometric data of a user may be affected by age. When the validation occurs, the newly-submitted biometric data may be compared to previously-submitted baseline biometric data. As long as the newly submitted biometric data is close (within a threshold) of the baseline biometric data, the signature can be validated. However, there still may be some differences between the new biometric data and the previous baseline biometric data. For example, fingerprints, retinal appearance, or other biometrics can appear a little different as a person ages, disease, etc. The system can automatically update the baseline data to deal with such changes when new biometric data is used and received to validate the user. The system may rely on artificial intelligence to compare the biometric data with the baseline biometric data of the user to determine when it is close enough even when the biometric data and the baseline biometric data are not an exact match.

Some of the technical benefits of this solution include ensuring that a digital signature is signed by the correct person in a way that is much more difficult to defraud than simply hashing a document or providing a copy of a digital certificate as is traditionally done. In this case, a user is expected to also provide at least one type of biometric to verify their identity. In addition, the biometric can be dynamically determined based on an importance or type of document being signed, thus providing more security for documents that involve more risk, higher chances for fraud, and the like. Another benefit/practical application of this solution is that the baseline biometric data that is used for verification can evolve as the user ages thereby making the baseline biometric data more accurate over time.

According to various additional examples and features of the instant solution, a user (sender) may use a mobile application or a mobile browser on their mobile device, to purchase an item from a merchant. When the user presses the "submit" button for the payment, the merchant may also dynamically request one or more types of biometric data samples from the user. Here, the merchant may generate a payment authorization request message and send it to the host system. Before processing the payment, the host system may dynamically determine a biometric data sample to request from the user based on the details of the transaction. For example, when the transaction is for an amount that is more than the user normally transacts, the system may request multiple biometric samples, and in some cases, may request that they be provided at the same time (e.g., speech and retina scan, etc.). The system may dynamically determine which biometric sample or samples to request from the user based on the transaction itself.

Accordingly, the system may verify that an account holder (registered user) of the account submitted the transaction using dynamically chosen biometric samples of the user. In this example, the system may compare the biometric data provided with the payment authorization request message to baseline biometric data of a registered user of the account. This enables the system to verify that a registered user of the account submitted the payment transaction. In response to such a verification, the system may then process the transaction as normal including checking to ensure the account has enough funds to satisfy the payment transaction and then authorizing and executing the payment transaction via an electronic payment network. Here, the system may modify the authorization request message to include an indication of the biometric verification and forward the modified authorization request message to a downstream node in the payment network such as an issuer system, a payment processor, an acquirer system, and the like.

Some of the technical benefits of this solution include ensuring that a transaction, such as a payment, is submitted by the correct person in a way that is much more difficult to defraud than simply inputting a personal identification number (PIN) code, a password, or the like. In this case, a user is expected to also provide at least one type of biometric to verify their identity. In addition, the biometric can be dynamically determined based on the content of the transaction itself, thus providing more security for transactions that involve more risk, higher chances for fraud, and the like. Another benefit/practical application of this solution is that the baseline biometric data that is used for verification can evolve as the user ages thereby making the baseline biometric data more accurate over time.

FIG. 1 is a system diagram illustrating an example operating environment of the instant solution. As shown, at least one computing device 110, and a host platform 120 communicate via a network 130. The host platform 120 may host a software service 140. The software service 140 may communicate with at least one database 150 through a network 130 during the course of service execution. Each computing device 110 may host a service client 160, which communicates with a corresponding software service 140.

A computing device 110 may be a mobile phone, tablet, laptop computer, desktop computer, smartwatch, vehicle infotainment system, or any computing device including a processor and memory. The host platform 120 may include a single physical server, multiple physical servers, a cloud hosting environment, or a hybrid hosting environment in which some components of the host platform 120 are "on-premise" while others are cloud-hosted. The network 130 is a computer network and may include at least one interconnected computer network. For example, network 130 may be or may include an Ethernet network, an asynchronous transfer mode (ATM) network, a wireless network, a telecommunications network or the like.

The software service 140 provides the service logic. It may provide at least one Application Programming Interface (API) for communicating with at least one service client 160. A "thick" user interface client that runs on a computing device 110 may utilize the APIs to communicate with the software service 140. Further, the software service 140 may provide hosted User Interfaces (UIs) that can be accessed through browser-based software on some computing devices 110.

The at least one service client 160 can enable service access for end users and may come in a variety of forms including, but not limited to, a mobile device application ("app") or a web portal accessed via a browser on a computing device 110 such as a laptop or desktop computer.

Detailed descriptions of the architecture and operation of the verification service in the instant solution are further described and depicted herein.

Figure 2A:
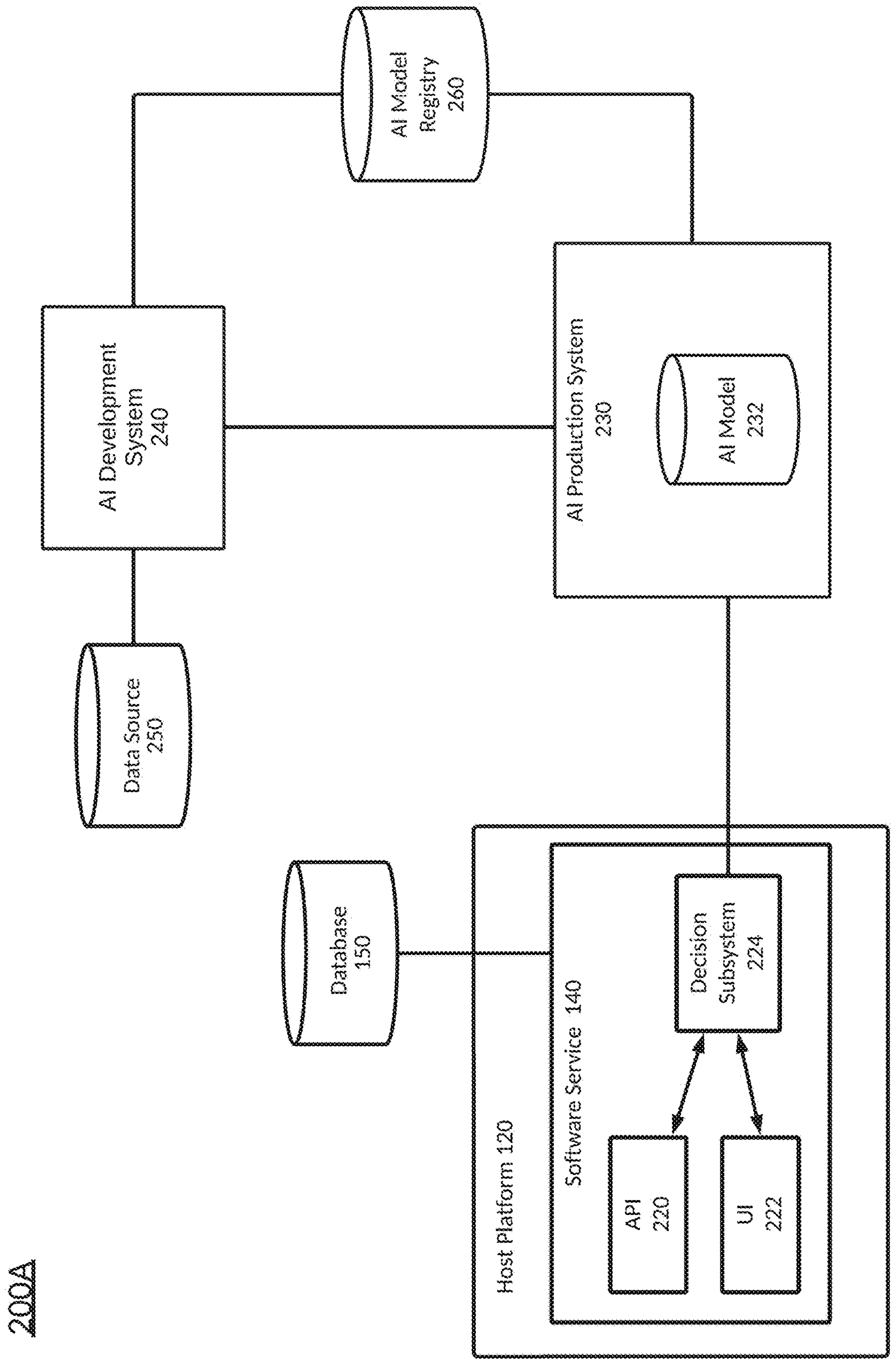
FIG. 2A is a system diagram illustrating integration of an artificial intelligence (AI) model into any decision point according to the examples and features of the instant solution.

FIG. 2A illustrates an artificial intelligence (AI) network diagram 200A that supports AI-assisted decision points in a software service executing on a computer. While the example instant solution shown utilizes a neural network, which is a type of machine learning (ML) model, other branches of AI, such as, but not limited to, computer vision, fuzzy logic, expert systems, deep learning, generative AI, and natural language processing, may be employed in developing the AI model in this instant solution. Further, the AI model included in these examples and features of the instant solution is not limited to particular AI algorithms. Any algorithm or combination of algorithms related to supervised, unsupervised, and reinforcement learning may be employed.

The AI models, ML models, neural networks, and other branches of AI, described and/or depicted herein, build upon the fundamentals of predecessor technologies and form the foundation for all future technological advancements in artificial intelligence. An AI classification system describes the stages of AI progression and advancement. The first classification is known as "reactive machines," followed by present-day AI classification "limited memory machines" (also known as "artificial narrow intelligence"), then progressing to "theory of mind" (also known as "artificial general intelligence") and reaching the AI classification "self-aware" (also known as "artificial superintelligence"). Present-day limited memory machines are a growing group of AI models built upon the foundation of their predecessors, reactive machines. Reactive machines emulate human responses to stimuli; however, they are limited in their capabilities as they cannot typically learn from prior experience. Once the AI model's learning abilities emerged, its classification was promoted to limited memory machines. In this present-day classification, AI models learn from large volumes of data, detect patterns, solve problems, generate, and predict data, and the like, while inheriting all the capabilities of reactive machines.

Examples of AI models classified as limited memory machines include, but are not limited to, chatbots, virtual assistants, machine learning, neural networks, deep learning, natural language processing, generative AI models, and any future AI models that are yet to be developed possessing characteristics of limited memory machines.

For example, a neural network is a type of machine learning model that relies on training data to learn associations and connections, increasing its accuracy for performing high speed data classifications, clustering, and other analyses of data. Such neural network capabilities are the foundation of deep learning models today as well as becoming the foundational blocks of those yet to be developed.

For example, generative AI models combine limited memory machine technologies, incorporating machine learning and deep learning, forming the foundational building blocks of future AI models. For example, theory of mind is the next progression of AI that may be able to perceive, connect, and react by generating appropriate reactions in response to an entity with which the AI model is interacting; all these theory of mind capabilities relies on the fundamentals of generative AI. Furthermore, in an evolution into the self-aware classification, AI models will be able to understand and evoke emotions in the entities they interact with, as well as possessing their own emotions, beliefs, and needs, all of which rely on generative AI fundamentals of learning from experiences to generate and draw conclusions about itself and its surroundings.

AI models may include, but are not limited to, at least one machine learning model, neural network model, deep learning model, generative AI model, or any combination of models from the branches of AI. AI models are integral and core to future artificial intelligence models. As described herein, AI model refers to present-day AI models and future AI models.

Software service 140 (see FIGS. 1, 2A), executing on host platform 120 (see FIGS. 1, 2A) may provide at least one API 220 that enable interaction with other software components via a set of data definitions and protocols. In some examples and features of the instant solution, the at least one API provided may employ Simple Object Access Protocol (SOAP), Remote Procedure Calls (RPC), and Representational State Transfer (REST) techniques. In some examples and features of the instant solution, the plurality of APIs 220 send data to at least one decision subsystem 224 of the software service 140 to assist in decision-making. In some examples and features of the instant solution, the software service 140 stores data included in API requests or data generated during processing the API requests into at least one database 150 (see FIGS. 1, 2A).

Software service 140 may provide at least one user interface (UI) 222, such as a server-side hosted graphical user interface (GUI). In some examples and features of the instant solution, the UIs 222 provided employ template-based frameworks, component-based frameworks, etc. In some examples and features of the instant solution, these UIs 222 send data to at least one decision subsystem 224 of the software service 140 to assist with decision-making. In some examples and features of the instant solution, the software service 140 stores data included in UI requests or data generated during processing the UI requests into at least one database 150.

Software service 140 may include at least one decision subsystem 224 that drive a decision-making process of the software service 140. In some examples and features of the instant solution, the decision subsystems 224 receive data from at least one API 220 as input into the decision-making process. In some examples and features of the instant solution, a decision subsystem 224 may receive data from at least one UI 222 as input to the decision-making process. A decision subsystem 224 may gather service configuration or historical execution data from at least one database 150 to aid in the decision-making process. A decision subsystem 224 may provide feedback to an API 220 or a UI 222.

An AI production system 230 may be used by a decision subsystem 224 in a software service 140 to assist in its decision-making process. The AI production system 230 includes at least one AI model 232 that is executed to generate a response, such as, but not limited to, a prediction, a categorization, a UI prompt, etc. In some examples and features of the instant solution, an AI production system 230 is hosted on a server. In some examples and features of the instant solution, the AI production system 230 is cloud-hosted. In some examples and features of the instant solution, the AI production system 230 is deployed in a distributed multi-node architecture.

An AI development system 240 creates at least one AI model 232. In some examples and features of the instant solution, the AI development system 240 utilizes data from at least one data source 250 to develop and train at least one AI model 232. The data sources 250 may be local or third-party data sources. Further, the data provided by the data sources may be real-world or synthetic. In some examples and features of the instant solution, the AI development system 240 utilizes feedback data from at least one AI production system 230 for new model development and/or existing model re-training. In some examples and features of the instant solution, the AI development system 240 resides and executes on a server. In some examples and features of the instant solution, the AI development system 240 is cloud hosted. In some examples and features of the instant solution, the AI development system 240 is deployed in a distributed multi-node architecture. In some examples and features of the instant solution, the AI development system 240 utilizes a distributed data pipeline/analytics engine.

Once an AI model 232 has been trained and validated in the AI development system 240, it may be stored in an AI model registry 260 for retrieval by either the AI development system 240 or by at least one AI production system 230. The AI model registry 260 resides in a dedicated server in one example of the instant solution. In some examples and features of the instant solution, the AI model registry 260 is cloud-hosted. In some examples and features of the instant solution, the AI model registry 260 resides in the AI production system 230. In some examples and features of the instant solution, the AI model registry 260 is a distributed database.

Figure 2B:
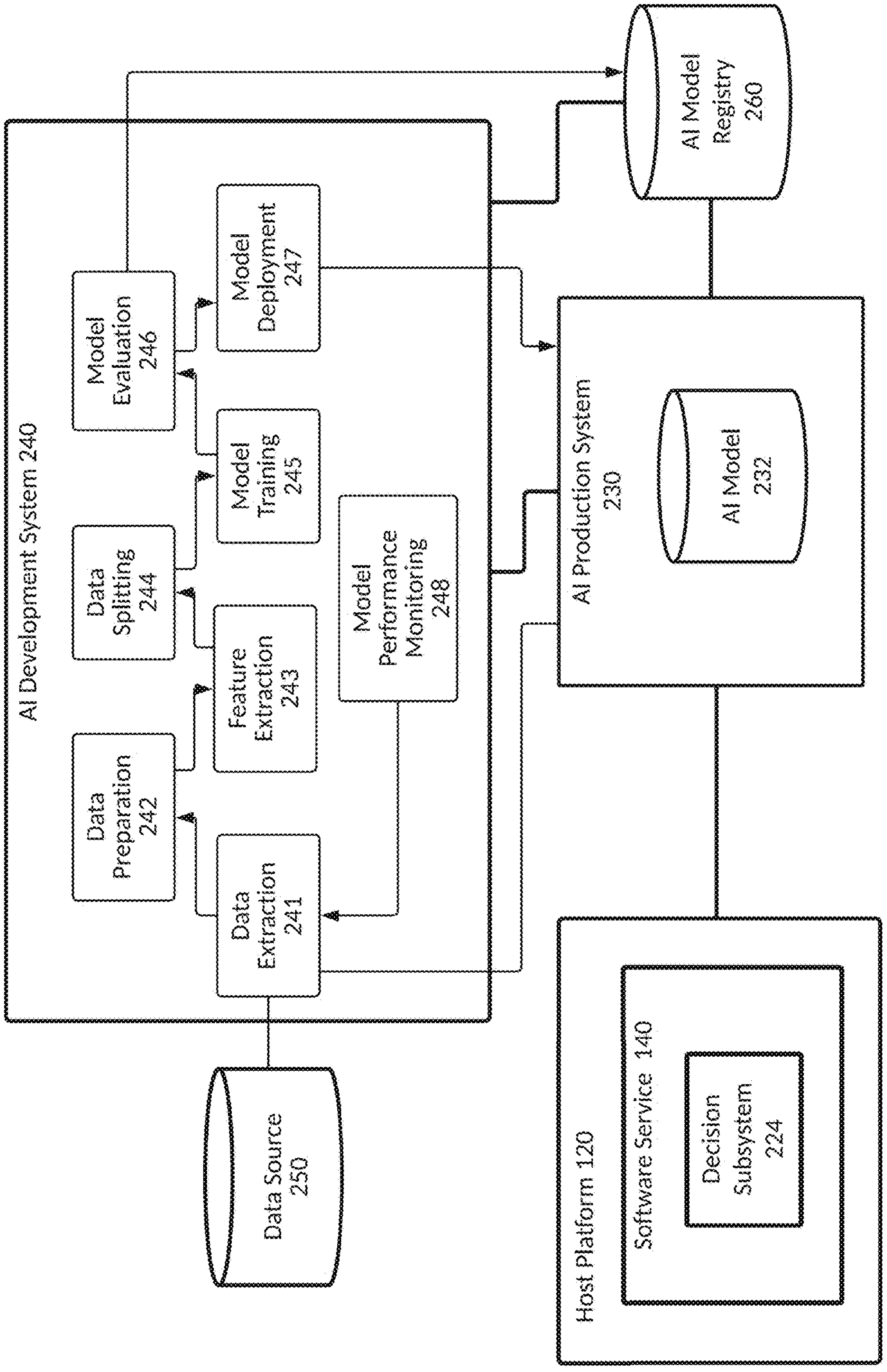
FIG. 2B is a diagram illustrating a process for developing an AI model that supports AI-assisted computer decision points according to the examples and features of the instant solution.

FIG. 2B illustrates a process 200B for developing at least one AI model that support AI-assisted decision points. An AI development system 240 executes steps to develop an AI model 232 that begins with data extraction 241, in which data is loaded and ingested from at least one data source 250. In some examples and features of the instant solution, historical model feedback data is extracted from at least one AI production system 230.

Once the data has been extracted during data extraction 241, it undergoes data preparation 242 for model training. In some examples and features of the instant solution, this step involves statistical testing of the data to see how well it reflects real-world events, its distribution, the variety of data in the dataset, etc., and the results of this statistical testing may lead to at least one data transformation being employed to normalize at least one value in the dataset. In some examples and features of the instant solution, data deemed to be noisy is cleaned. A noisy dataset includes values that do not contribute to the training, such as, but not limited to, null and long string values. Data preparation 242 may be a manual process or an automated process using at least one of the elements and/or functions described and/or depicted herein.

Features of the data are identified and extracted during the feature extraction step 243. In some examples and features of the instant solution, a feature of the data is internal to the prepared data from the data preparation step 242. In some examples and features of the instant solution, a feature of the data requires a piece of prepared data from the data preparation step 242 to be enriched by data from another data source to be useful in developing the AI model 232. In some examples and features of the instant solution, identifying features may be a manual process or an automated process using at least one of the elements and/or functions described and/or depicted herein. Once the features have been identified, the values of the features are collected into a dataset that will be used to develop the AI model 232.

The dataset output from the feature extraction step 243 is split 244 into a training and validation data set. The training data set is used to train the AI model 232, and the validation data set is used to evaluate the performance of the AI model 232 on unseen data.

The AI model 232 is trained and tuned 245 using the training data set from the data splitting step 244. In this step, the training data set is provided to an AI algorithm and an initial set of algorithm parameters. The performance of the AI model 232 is then tested within the AI development system 240 utilizing the validation data set from step 244. These steps may be repeated with adjustments to at least one algorithm parameter until the model's performance is acceptable based on various goals and/or results.

The AI model 232 is evaluated 246 in a staging environment (not shown) that resembles the target AI production system 230. This evaluation uses a validation dataset to ensure the performance in an AI production system 230 matches or exceeds expectations. In some examples and features of the instant solution, the validation dataset from step 244 is used. In some examples and features of the instant solution, at least one unseen validation dataset is used. In some examples and features of the instant solution, the staging environment is part of the AI development system 240, and the staging environment is managed separately from the AI development system 240. Once the AI model 232 has been validated, it is stored in an AI model registry 260, where it can be retrieved for deployment and future updates. In some examples and features of the instant solution, the model evaluation step 246 may be a manual process or an automated process using at least one of the elements and/or functions described and/or depicted herein.

In some examples and features of the instant solution, the AI development system includes a user interface (not shown). The user interface may be used to manage the development system infrastructure, the steps 241-248 within the development system, the interim data transmitted between the various steps 241-248, and the data sources 250.

Once an AI model 232 has been validated and published to an AI model registry 260, it may be deployed during the model deployment step 247 to at least one AI production system 230. In some examples and features of the instant solution, the performance of deployed AI model 232 is monitored 248 by the AI development system 240. In some examples and features of the instant solution, AI model 232 feedback data is provided by the AI production system 230 to enable model performance monitoring 248, and the AI development system 240 periodically requests feedback data for model performance monitoring 248, which includes at least one trigger that results in the AI model 232 being updated by repeating steps 241-248 with updated data from at least one data source 250.

Figure 2C:
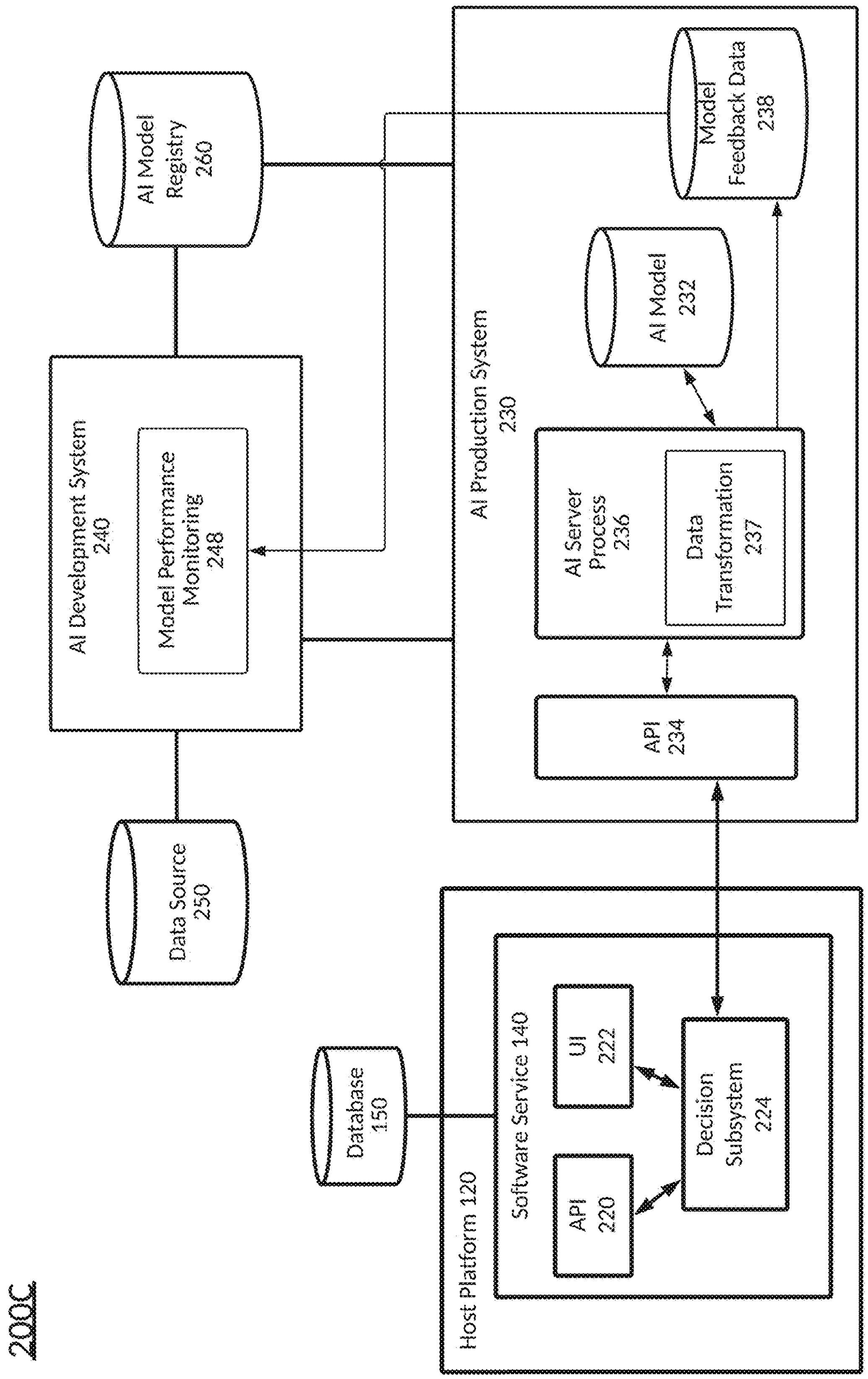
FIG. 2C is a diagram illustrating a process for utilizing an AI model that supports AI-assisted computer decision points according to examples and features of the instant solution.

FIG. 2C illustrates a process 200C for utilizing an AI model that supports AI-assisted decision points. As stated previously, the AI model utilization process depicted herein reflects ML, which is a particular branch of AI, but this instant solution is not limited to ML and is not limited to any AI algorithm or combination of algorithms.

Referring to FIG. 2C, an AI production system 230 may be used by a decision subsystem 224 in software service 140 to assist in its decision-making process. The AI production system 230 provides an API 234, executed by an AI server process 236 through which requests can be made. In some examples and features of the instant solution, a request may include an AI model 232 identifier to be executed based on the type of request. In some examples and features of the instant solution, a data payload (e.g., to be input to the AI model during execution) is included in the request. The data payload may include API 220 data from software service 140, UI 222 data from software service 140 or data from other software service 140 subsystems (not shown).

Upon receiving the API 234 request, the AI server process 236 may transform 237 the data payload or portions of the data payload to be valid feature values in an AI model 232. Data transformation 237 may include, but is not limited to, combining data values, normalizing data values, and enriching the incoming data with data from other data sources 250. Once the data transformation occurs, the AI server process 236 executes the appropriate AI model 232 using the transformed input data. Upon receiving the execution result, the AI server process 236 responds to the API requester, which is a decision subsystem 224 of software service 140. In some examples and features of the instant solution, the response may result in an update to a UI 222 in software service 140. In some examples and features of the instant solution, the response includes a request identifier that can be used later by the software service 140 to provide feedback on the performance of the AI model 232. In some examples and features of the instant solution, a model feedback record may be added into a model feedback data 238 by the AI server process 236.

In some examples and features of the instant solution, the API 234 includes an interface to provide AI model 232 feedback after an AI model 232 execution response has been processed. This mechanism enables the requester to provide feedback on the accuracy of the AI model 232 results. In some examples and features of the instant solution, the feedback interface includes the identifier of the initial request so that it can be used to associate the feedback with the request. Upon receiving a call into the feedback interface of the API 234, the AI server process 236 creates and adds a model feedback record into the model feedback data 238 which holds historical model feedback records. In some examples and features of the instant solution, the records in this model feedback data 238 are provided to model performance monitoring 248 in the AI development system 240. This model feedback data is streamed to the AI development system 240 or may be provided upon request. In some examples and features of the instant solution, the model feedback records in the model feedback data 238 are used as an input for retraining the AI model 232.

Model retraining involves repeating steps 241-246 using the current data in the data source 250 along with the model feedback data 238. In some examples and features of the instant solution, the AI model 232 is retrained periodically as a matter business process in order to consider the latest data and/or retrained based on a trigger, such as, but not limited to, a recent model accuracy falling below a predetermined threshold. In some examples and features of the instant solution, the model feedback data 238 is used as an input to determine the recent model accuracy.

In some examples and features of the instant solution, the AI production system 230 includes a user interface (not shown). The user interface may be used to manage the production system infrastructure, the components of the production system 230-238, and the operation of the AI production system and its components.

Figure 3:
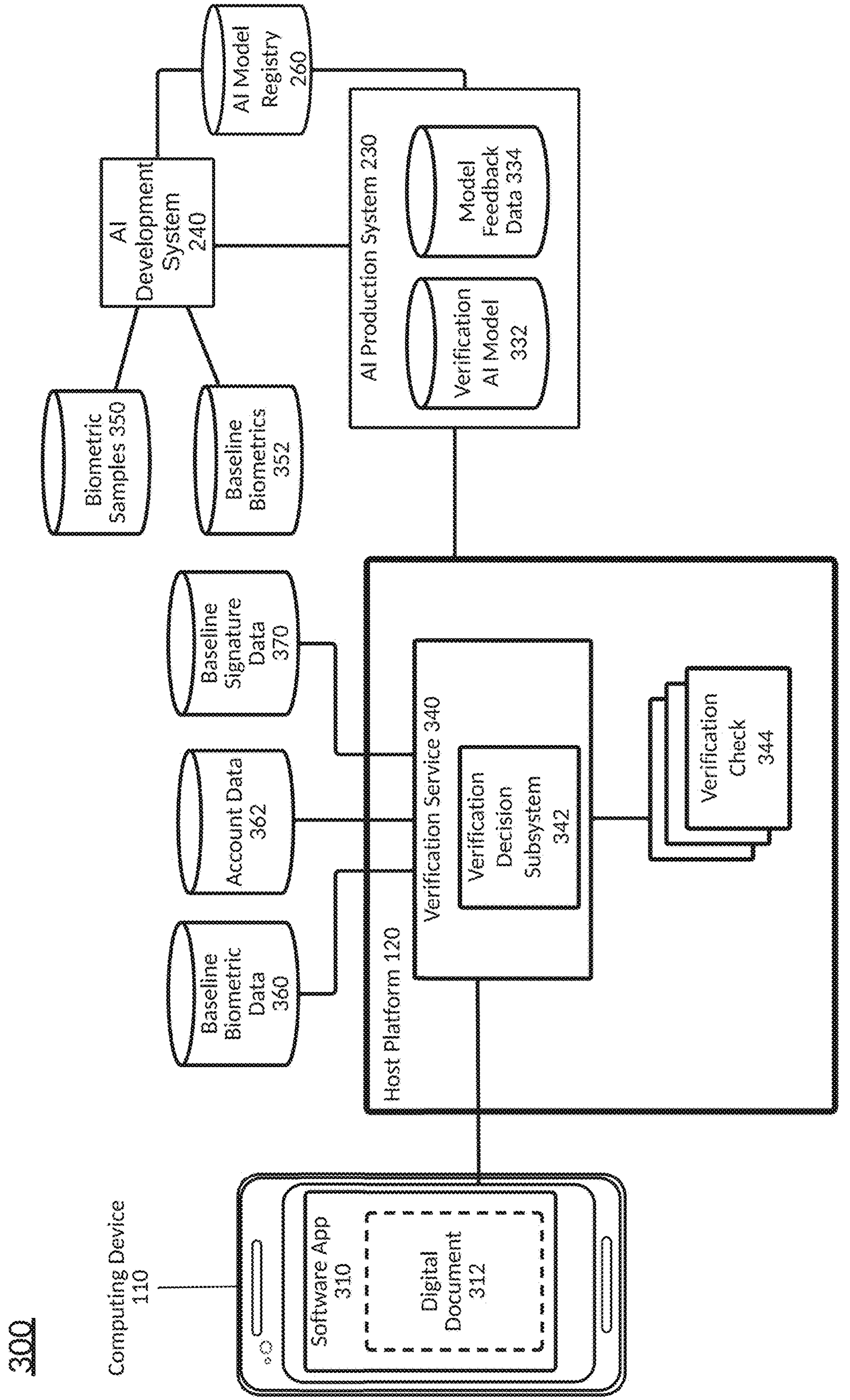
FIG. 3 is a system diagram illustrating an operating environment for a digital signature verification process, according to examples and features of the instant solution.

FIG. 3 is a system diagram illustrating an operating environment 300 for a verification service that can verify a digital signature, a transaction, or the like, according to examples and features of the instant solution. Although the example is described with respect to verifying a digital signature, it should be appreciated that similar steps can be performed to verify a transaction.

In some examples and features of the instant solution, verification AI model 332 is trained using historical biometrical samples, historical baseline biometric samples mapped to the historical biometric samples, model feedback data, and the like to generate an AI model that can predict whether an input biometric sample is a match to a baseline biometric sample given a set of feature data transformed from a set of application data and computing device data. The verification AI model 332 is an example of AI model 232 (see, for example, FIGS. 2A-2C). A database with biometric samples 350 and a database with baseline biometric samples 352 corresponding to the biometric samples are examples of data source 250 (see, for example, FIGS. 2A-2C) which can be used to train the verification AI model 332.

In some examples and features of the instant solution, the verification AI model 332 is trained using at least one neural network training method such as, but not limited to, gradient descent, stochastic gradient descent, random search, uniform search, basin hopping, and Krylov. In some examples and features of the instant solution, the verification AI model 332 is a single or multi-layer perceptron neural network, a feed-forward neural network, a radial basis functional neural network, a recurrent neural network, or a modular neural network.

In some examples and features of the instant solution, the verification AI model 332 may include, but is not limited to, at least one of a machine learning model, a deep learning model, a neural network, any combination of models from the branches of AI, and the like, and it may be trained using at least one of the respective training methods for machine learning models, deep learning models, neural networks, any combination of models from the branches of AI, and the like. In some examples and features of the instant solution, the training data may include, but is not limited to, at least one of baseline biometric samples, biometric samples mapped to the baseline biometric samples, model feedback data 334, which may be received from a user, etc., and the like. In some examples and features of the instant solution, the training data for the verification AI model 332 may include, but is not limited to, internal data sources, external data sources, private data sources, public data sources, or the like.

In some examples and features of the instant solution, baseline biometric data may include, but is not limited to, retina scans, fingerprints, facial images, voice inputs, brainwaves, biological samples with genetic code (e.g., DNA samples), and the like, which are captured of the user at a previous point in time such as during a registration process. As another example, the baseline biometric data may include data that is provided for purposes of verification and subsequently added to the baseline biometric data after determining it is valid. The biometric samples mapped to the baseline biometric data may include biometric samples used after the registration process and which have been successfully matched to an existing baseline biometric sample.

The model feedback records in the model feedback data 334 may include, but is not limited to, user inputs indicating that the verification decision are correct or incorrect. For example, if a user did provide their biometric sample and the user previously registered a similar biometric sample, the baseline biometric sample is expected to match the newly received biometric sample. However, in some cases, the verification AI model 332 may be unable to verify the newly received biometric sample. In this case, the user can input feedback indicating that the model incorrectly found the newly received biometric sample to not be a match, which can be used to further retrain the verification AI model 332.

Once the verification AI model 332 is trained and validated, it is deployed to an AI production system 230 (see, for example, FIGS. 2A-2C, 3) for use by a verification service 340. The verification service 340 is an example of software service 140 (see, for example, FIG. 1, 2A-2C). For example, the verification service 340 may execute a verification decision subsystem 342 which can launch verification checks 344 to match biometric samples to baseline biometrics using the verification AI model 332.

In some examples and features of the instant solution, the software application 310 running on computing device 110 is an example of service client 160 (see FIG. 1). The software application 310 may enable a user to sign a digital document 312 and submit the digital document 312 (with the digital signature) to the verification service 340 via a computer network. The digital document 312 may be transferred using a message, an email, and the like.

In some examples and features of the instant solution, the verification service 340 receives the digital document from the software application 310 along with any biometric data provided from the computing device 110. The data may include, but is not limited to, biometric samples captured in real-time (or near real-time) such as retina scans, fingerprints, facial images, voice inputs, brainwaves, biological samples with genetic code (e.g., DNA), and the like.

Additionally, the verification service 340 may receive data about the computing device 110. The device data may include, but is not limited to, the media access control (MAC) address and the source internet protocol (IP) address of the computing device. Furthermore, the verification service 340 may ingest baseline biometric data of the user from a database of baseline biometric data 360, account data of the user from a database of account data 362, and baseline signature data of the user from a database of baseline signature data 370. The baseline signature data of the user may include a digital certificate assigned to the user by a key management system, a hash function used by the user, and the like.

In some examples and features of the instant solution, the verification service 340 may continue to receive and process data from the software application 310 in parallel to the verification check 344 being determined.

In some examples and features of the instant solution, upon receiving the request, the AI production system 230 (see FIGS. 2A-2C, 3) performs data transformation 237 (see FIG. 2C) on the set of required data into a set of valid feature values in the AI model.

The results of the verification performed by the verification AI model 332 may be provided to the verification service 340 and used by the verification service 340 to verify the digital document 312. For example, the verification service 340 may edit the digital document 312 when the biometric verification is successful by changing an appearance of the digital document, adding content to the digital document, and the like. In some examples and features of the instant solution, upon receiving the response, the verification service 340 may also output a notification on the software application 310 on the computing device 110 letting the user know that the digital signature and the biometric associated therewith have been successfully verified.

FIGS. 4A-4D illustrate a process of verifying a digital signature attached to a digital document according to various examples and features of the instant solution. In these examples, the system described herein may use biometric data provided at the same time that the digital document is signed to further increase the security of the signature verification process. The benefits of the example of the instant solution are that the system can ensure the authenticity of the digital signature attached to the digital document based on biometric data of the user that is responsible for signing the digital document.

In the examples and features of the instant solution, a user may register their biometric samples ahead of time with the software application. The biometric samples may be used to build a baseline of biometric data samples for the user for use in future verifications. Furthermore, over time, the biometric data of the user may change, for example, due to aging, due to disease, due to activity, due to environment, and the like. The examples and features of the instant solution may modify the baseline biometric data of the user over time thereby increasing the accuracy of the baseline data and enabling the verification process to evolve as the user's biometric data also evolves.

Figure 4A:
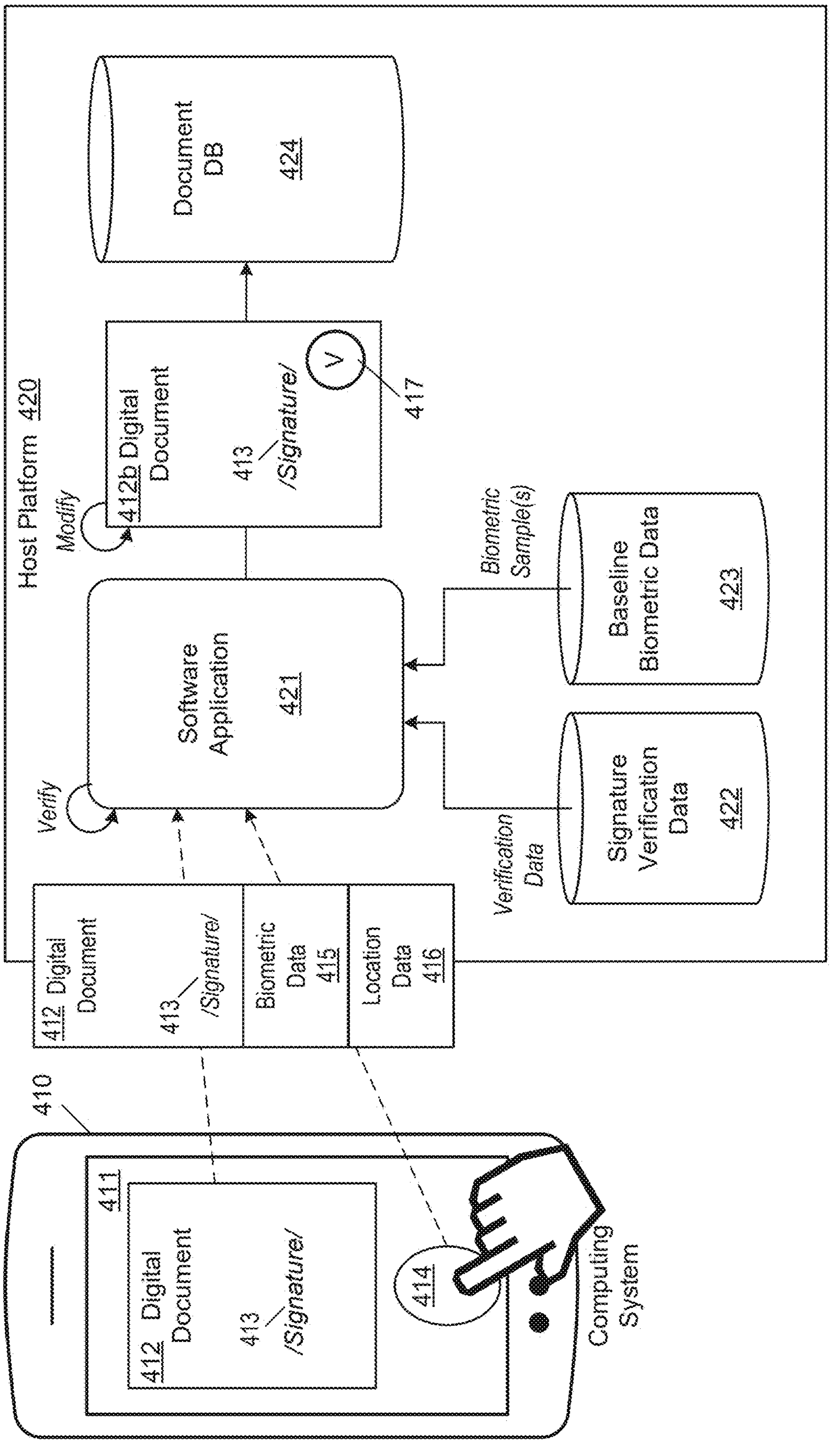
FIG. 4A is a diagram illustrating a process of verifying a digital signature according to examples and features of the instant solution.

FIG. 4A illustrates a process 400A of verifying a digital signature according to examples and features of the instant solution. Referring to FIG. 4A, a host platform 420, for example, a cloud platform, a web server, a distributed system, or the like, may host a software application 421. A user may use a computing system 410, for example, a mobile device, a desktop computer, a laptop computer, a smart-wearable device, and the like, to access the software application 421. For example, the software application 421 may be a mobile application which can be downloaded by the computing system 410, for example, from a software application marketplace or the like, and installed by the computing system 410. As another example, the software application 421 may be a progressive web application which can be accessed by an IP address. For example, the user may input the IP address of the software application 421 into a browser/mobile browser installed on the computing system 410.

In this example, the user is signing a digital document 412 with a digital signature 413. Here, the digital document 412 may be stored in a document database 424 on the host platform 420 and may be accessed by the user via a display device 411 of the computing system 410. Here, the user may open the digital document 412 and view the content within the digital document 412 via a graphical user interface (GUI) of the software application 421. Here, the user may also use a finger, cursor, stylus, or the like, to sign (physically) the document using a digital signature. For example, the user may input commands to the GUI of the software application 421 which causes a digital signature 413 to be added to the digital document 412. For example, the user may draw or otherwise make a motion with their hand to simulate letters being written thereby causing a written signature in digital form to be applied to the digital document 412. As another example, the digital signature 413 may be typed into a field, an image pasted into the document, or the like.

According to various examples and features of the instant solution, in addition to signing the digital document 412, the software application 421 may request, require, etc. additional verification data such as biometric data, geographic location data, or the like. In this example, a user may submit biometric samples including fingerprints, retina scans, iris scans, voice input, biological samples with genetic code (e.g., DNA), brain waves, or the like. In FIG. 4A, the computing system 410 includes a display device 411 with touch-input capabilities. Here, a user may press on a location 414 on the display device 411 to generate a fingerprint which is then sent to the software application 421. As another example, the computing system 410 may include a camera (not shown) which the user can use to capture an image of their face, retinas, or the like, a microphone (not shown) which the user can use to capture speech/voice input, and the like.

The biometric data may be sent from the computing system 410 to the software application 421 over a computer network between the computing system 410 and the host platform 420. In addition, the digital document 412, the digital signature 413, and geographic location data 416 of the computing system 410, may be submitted to the software application 421 over the computer network. In response, the software application 421 may verify the digital signature 413 as further described in the example of FIG. 4B, and may also verify the biometric data 415, the geographic location data 416, and the like. For example, the software application 421 may use an identifier of the user, the software application, etc. to identify verification data for verifying the digital signature, the biometric data, and the geographic location. In this example, the software application 421 may query a database of signature verification data 422 and may query a database of baseline biometric data 423, samples, etc. of the user.

The software application 421 may verify the digital signature 413 based on the digital signature verification data. In addition, the software application 421 may verify the biometric data 415 using the baseline biometric data. An example of performing a biometric verification is shown in FIG. 4D. Furthermore, the type of biometric data that is requested by the software application 421 may be determined dynamically as shown in the example of FIG. 4C.

In FIG. 4A, the software application 421 may verify the digital signature 413 and the biometric data 415 and may determine the digital signature 413 is verified. Here, the software application 421 may alter the digital document 412 to generate a modified digital document 412*b*. The modification may include adding additional content 417 (e.g., a ribbon, a stamp, etc.) to signify that the digital signature has been successfully verified. As another example, the software application 421 may modify or alter existing content within the digital document 412 such as changing an appearance of the document, changing a color, changing meta data, and the like. The modified digital document 412*b* may be stored in the document database 424 and accessed by other computing systems that are connected to the software application 421. For example, another party with access to the digital document 412 may view the modified digital document 412*b*.

Figure 4B:
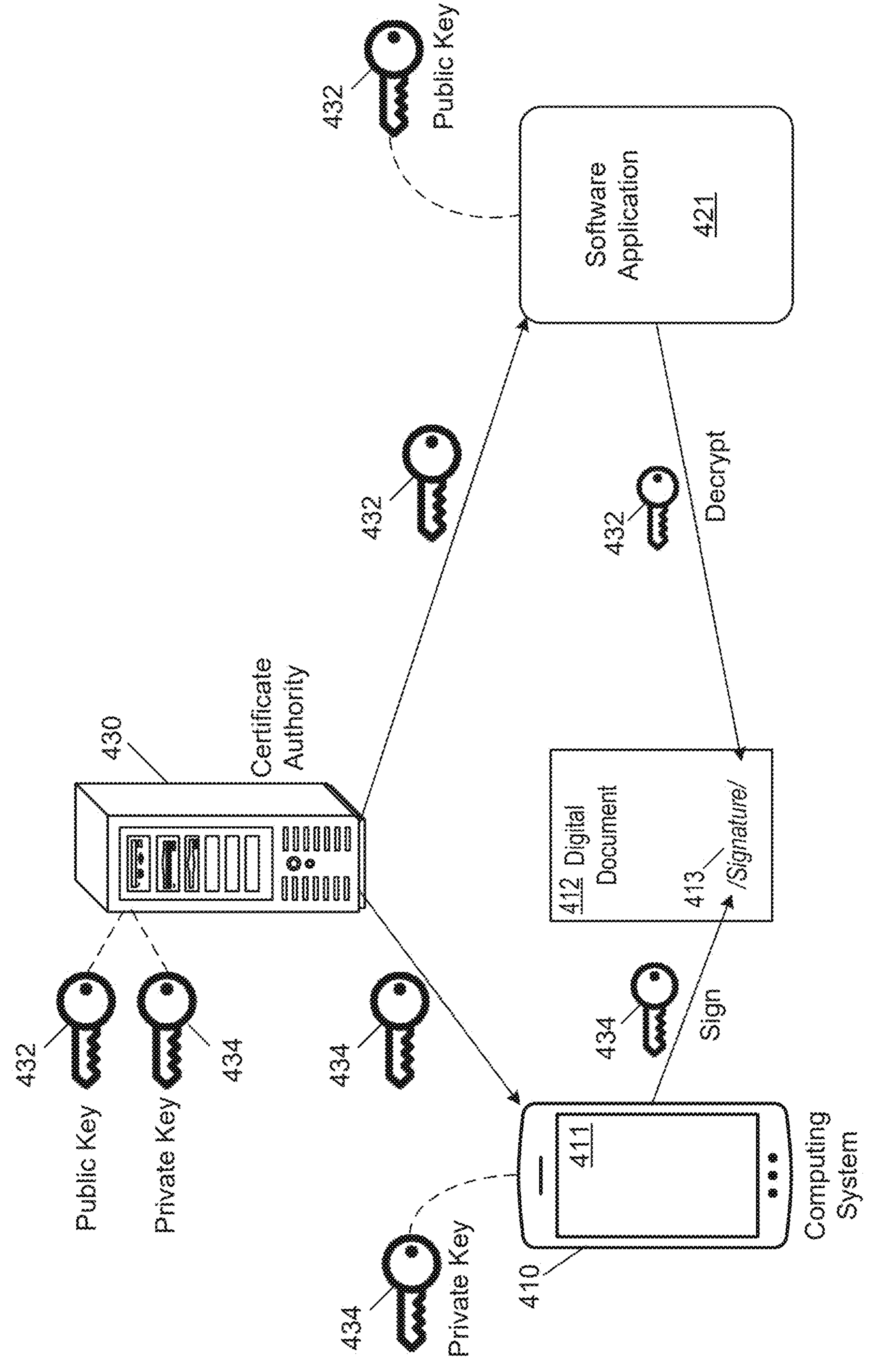
FIG. 4B is a diagram illustrating a process of encrypting and signing a digital document according to examples and features of the instant solution.
Figure 4C:
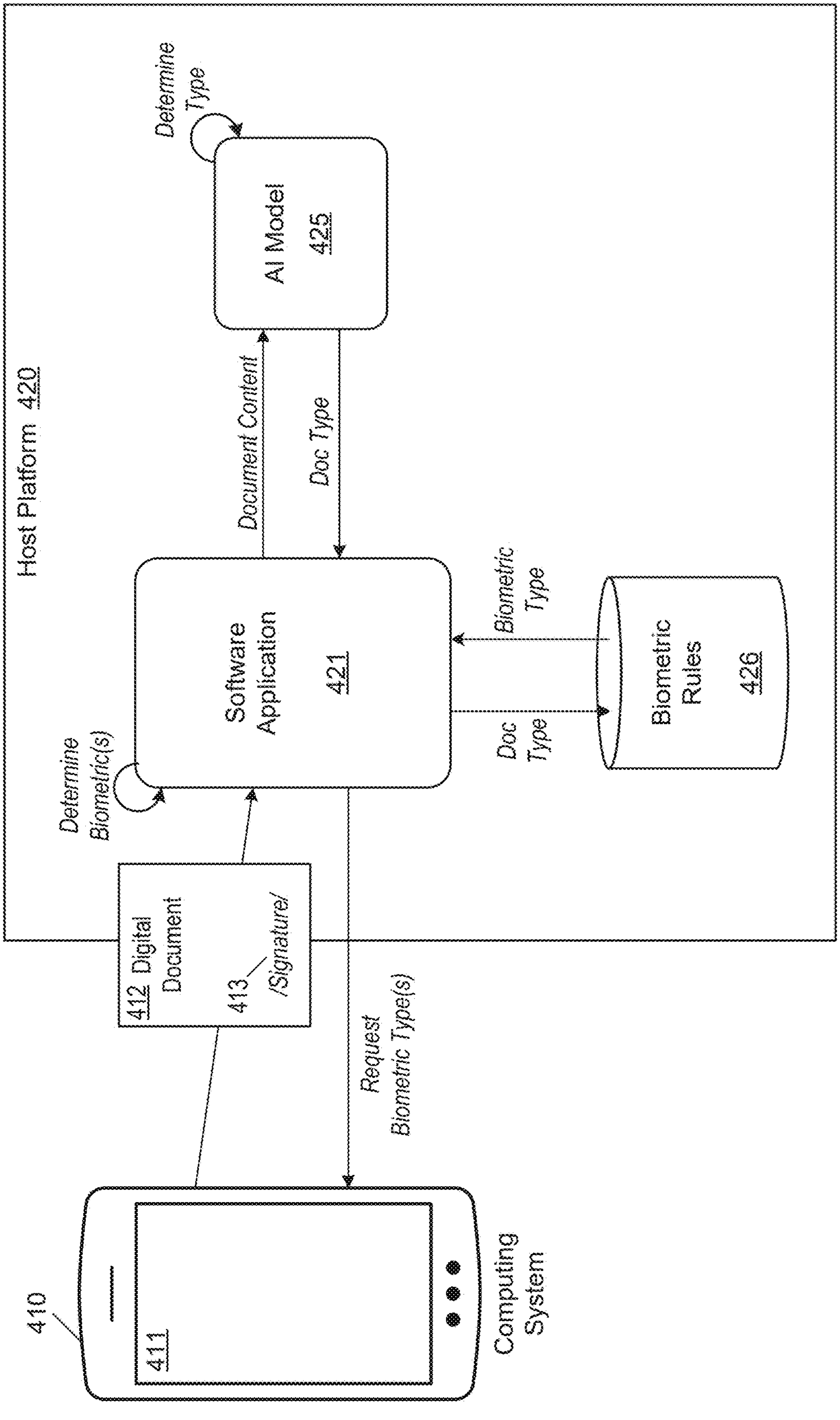
FIG. 4C is a diagram illustrating a process of dynamically requesting a type of biometric based on document content according to examples and features of the instant solution.
Figure 4D:
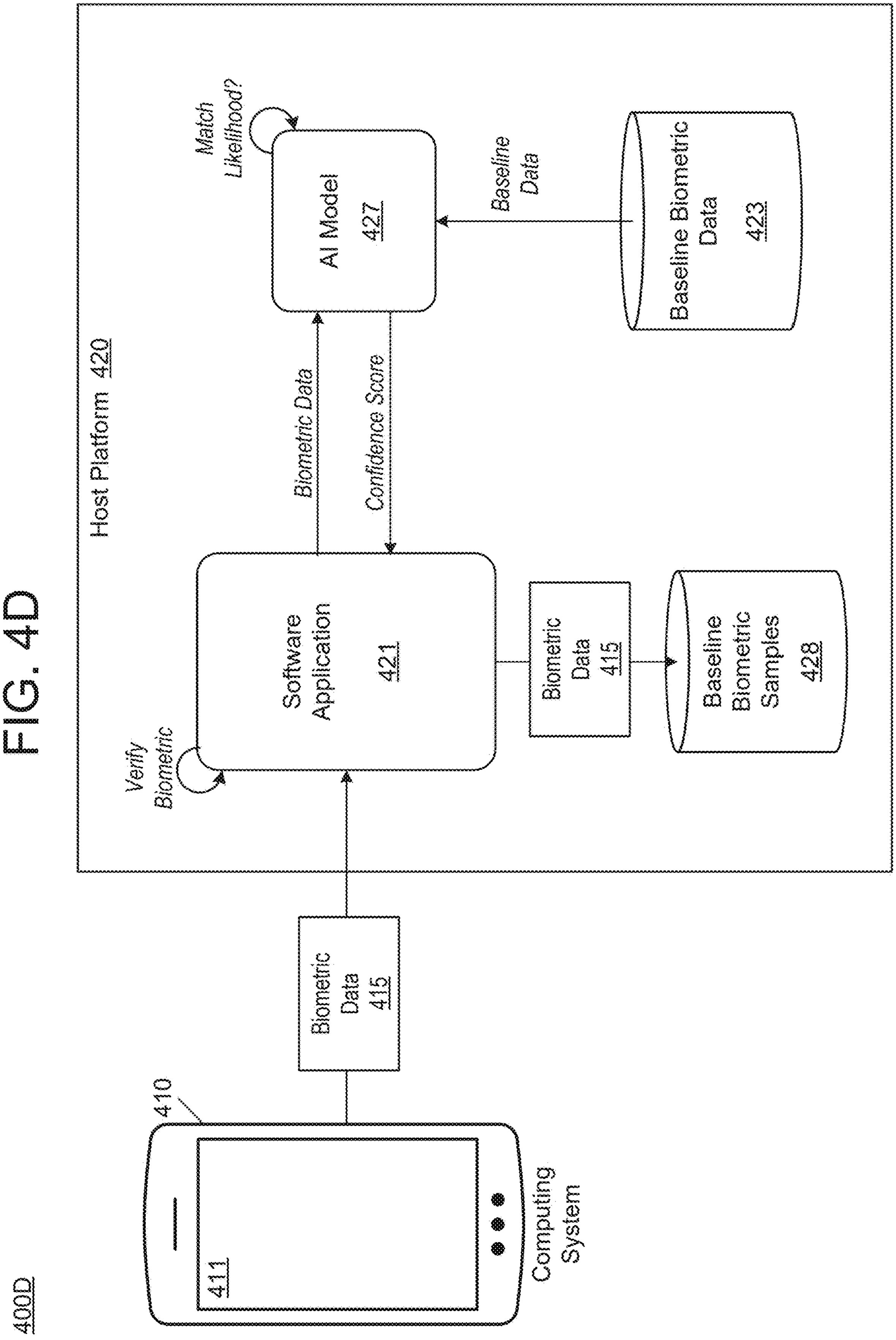
FIG. 4D is a diagram illustrating a process of verifying biometric data according to examples and features of the instant solution.

FIG. 4B illustrates a process 400B of encrypting and signing a digital document according to examples and features of the instant solution. For example, the process 400B may correspond to the digital signature verification process described with respect to FIG. 4A. Referring to FIG. 4B, the computing system 410 may register with a certificate authority 430, for example, by providing identification information, profile data, and the like. In response, the certificate authority 430 may generate an asymmetric key pair including a private key 434 and a public key 432 corresponding thereto. The certificate authority 430 may allocate the private key 434 to the computing system 410 and provide the public key 432 to any computing system that is authorized by the computing system 410. In this example, the public key 432 is provided to the software application 421 on the host platform.

To verify the digital signature 413, the computing system 410 may hash the digital document 412 and sign the hash with the private key 434. Here, the computing system 410 may transmit the signed hash of the digital document 412 to the software application 421. In response, the software application 421 may decrypt the signed hash of the digital document to reveal the hash of the digital document. In addition, the software application 421 hashes the digital document 412 locally to generate a corresponding hash of the digital document. The software application 421 may compare the decrypted hash value and the corresponding hash value. If equal, the software application 421 may determine that the digital signature is verified.

When any change happens to the public key 432, the private key 434, the digital document 412, the hash function, or the like, the digital signature will not be successfully verified. This is because any of these changes will cause a change to the hash value of the digital document.

FIG. 4C illustrates a process 400C of dynamically requesting a type of biometric based on document content according to examples and features of the instant solution. According to various examples and features of the instant solution, one or more AI models 425 may be used to predict a type of the digital document 412, for example, a will, a deed, a contract, a sale, an application, a form, etc. and provide the type of document to the software application. Here, the AI model 425 may refer to predefined document types and may try to match the document to a predefined type from among multiple predefined types of documents. As another example, when the AI model 425 is unable to match the type of digital document, the AI model 425 may return a response of unknown.

The software application 421 may determine the type of biometric data to request from the user based on the type of the digital document 412 output by the AI model 425. Here, the software application 421 may use a set of rules stored within a rules database of biometric rules 426 which include predefined document types mapped to types of biometrics to perform. The software application 421 may control a page, GUI, etc. which is being viewed via the computing system 410 on the display device 411 and requesting entry of the type of biometric(s) selected by the software application 421.

The AI model 425 is an example of AI model 232 (see, for example, FIGS. 2A-2C) and the software application 421 is an example of software service 140 (see, for example, FIG. 1, 2A-2C).

FIG. 4D illustrates a process 400D of verifying biometric data 415 associated with the digital signature 413 and adding the biometric data 415 to a set of baseline biometric samples 428 for use in future verification processes according to examples and features of the instant solution. Referring to FIG. 4D, the computing system 410 may obtain the biometric data 415 from the user via at least one of the touch screen, camera, microphone, and the like. The biometric data 415 may be received by the software application 421 from the computing system 410. The software application 421 may also identify baseline biometric data associated with the user based on a user identifier such as an account identifier, etc., and compare the baseline biometric data to the biometric sample to determine when the biometric sample is accurate.

Here, the software application 421 may invoke (e.g., execute an API call) to an AI model 427 with the baseline biometric data and the biometric data 415. In response, the AI model 427 determines a confidence score indicating how closely the biometric data 415 is to the baseline biometric data stored in the user's data. The confidence score may be provided to the software application 421. In response, the software application 421 can compare the confidence score to a threshold to determine when the biometric data 415 is accurate, when the biometric data 415 is to be added to the set of baseline biometric samples 428, and the like. In this example, the software application 421 determines to add the biometric data 415 to the set of baseline biometric samples 428 of the user.

For example, the AI model 427 is an example of AI model 232 (see, for example, FIGS. 2A-2C) and may be trained to determine a likelihood value (e.g., a confidence score) that a biometric data sample is equivalent to a baseline biometric sample. Here, the output value (e.g., the confidence score) may be a value between 0 and 1, where 1 indicates an identical match and 0 indicates a lack of any similarity. The values may vary between 0 and 1, and the software application 421 may compare a threshold value (e.g., 0.8, 0.9, etc.) to the confidence score to determine whether the biometric data provided by the user is close enough to being a match to the baseline biometric data.

In this example, an exact score is not required for the biometric data 415 to be found accurate nor to be added to the baseline biometric samples 428. For example, the biometric data 415 may be similar enough (e.g., 95% accurate) to be considered a verified biometric sample, but not be an exact match to the biometric sample previously registered by the user. Furthermore, the biometric data 415 can be added to the baseline biometric samples 428 which can be used for subsequent biometric verifications of the same kind. Accordingly, the biometric data 415 can evolve over time as the user's biometric data changes over time as well.

FIGS. 5A-5E illustrate a process of dynamically selecting at least one type of biometric to be used to authorize a transaction (e.g., a data transfer of value from a sender to a receiver, a withdrawal of value, a deposit of value, etc.). The biometric type may be dynamically selected based on details/attributes of the transaction, for example, an amount of value involved in the transaction, a type of the transaction, a time period of the transaction, and the like. The biometric may then be provided by the sender and may be used by the system to verify the identity of the sender using baseline biometric data of the sender that is previously registered with the system.

According to various examples and features of the instant solution, the biometric authentication may be used by the system to modify an authorization request message prior to sending the authorization request message to downstream nodes in the payment network, for example, an issuer system, an acquirer system, a payment processor, and the like. Here, the system may modify the authorization request message by storing a code, value, etc. within a field of the authorization request message. As an example, the field may be an "optional" field, however, examples of the instant solution are not limited thereto. In some examples and features of the instant solution, the value may be added to a field that already includes a value (e.g., the amount field, etc.). That is, two values may be stored in one field. The downstream nodes may be aware of this and may have the algorithm needed for interpreting the two values in the same field.

In some examples and features of the instant solution, the code may be a predefined code of which other payment network participants are aware. This enables the other network participants to understand that the authorization request has been verified through biometrics thereby increasing the security of the overall process throughout the payment network. As another example, the code may be a dynamically generated code, for example, a hash value of the biometric data, etc. which can be verified by a back-end system that also has access to the baseline biometric data, for example, an issuer of the payment account, etc.

The system described herein may be a software application such as a mobile application with which the sender registers. For example, the sender may provide account information, user information, profile information, biometric samples, and the like, which can be used by the software application to build a set of biometric samples for future verifications. The user may use a device such as a mobile device, etc. to capture biometric data (e.g., retinal scans, fingerprints, iris scans, speech/voice inputs, brainwaves, etc.) and submit the biometric data to the software application. Over time, the biometric samples can be updated by the system as the user ages because the biometric samples of the user can change over time. For example, the system may use biometric data obtained during a verification process to update the baseline biometric samples used for future verifications.

Figure 5A:
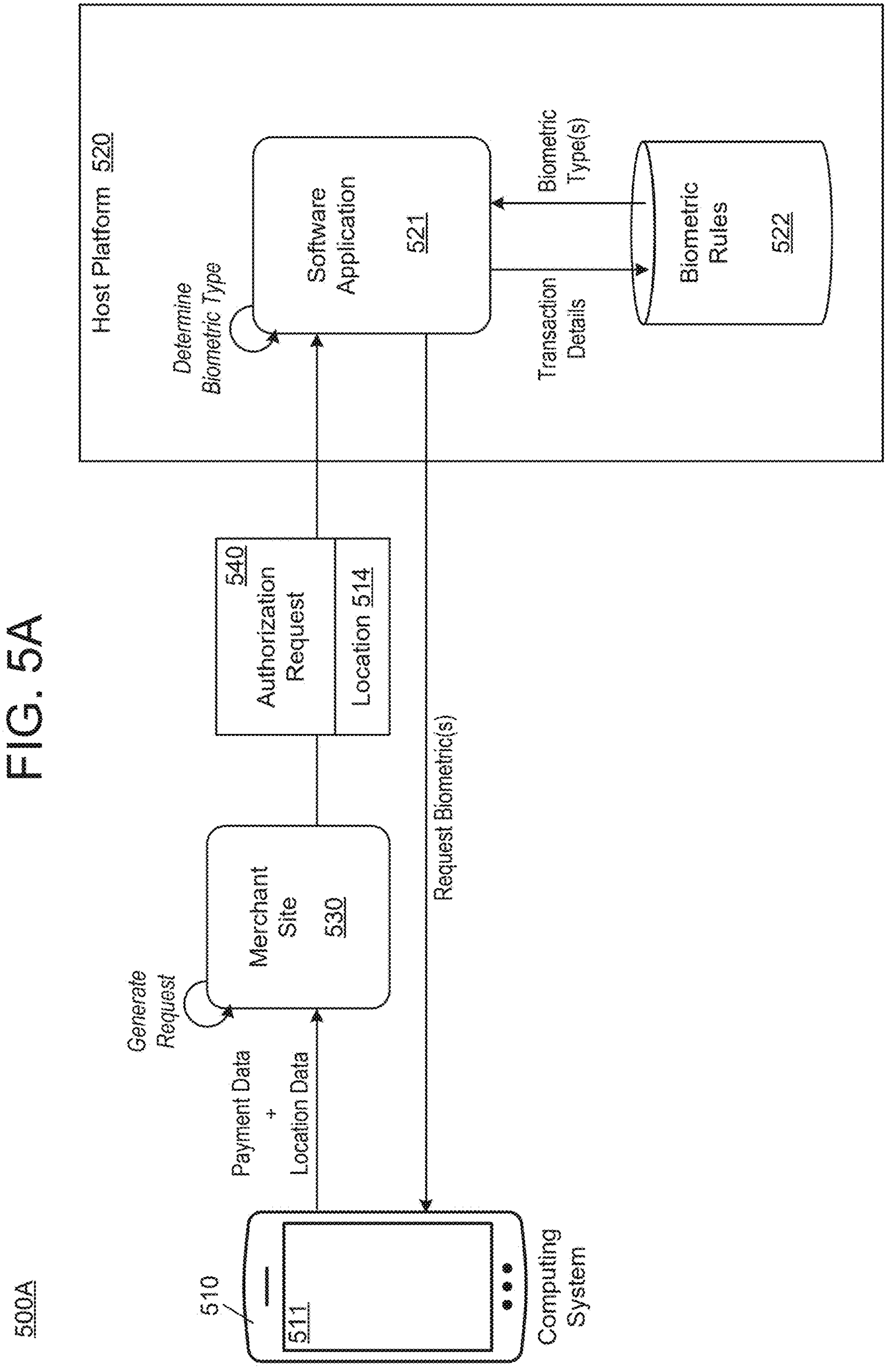
FIG. 5A is a diagram illustrating a process of dynamically requesting a type of biometric for verifying a transaction according to examples and features of the instant solution.

FIG. 5A illustrates a process 500A of dynamically requesting a type of biometric for verifying a transaction according to examples and features of the instant solution. Referring to FIG. 5A, a user may use a computing system 510 to connect to a software application 521 hosted by a host platform 520. For example, the computing system 510 may connect to the host platform 520 over a computer network such as the Internet. The software application 521 may be a progressive web application that can be accessed by a browser installed on the computing system 510. As another example, the software application 521 may be a mobile application. A front-end of the mobile application may be downloaded and installed on the computing system 510.

According to various examples and features of the instant solution, the user may enter into a transaction (e.g., a transfer of data/value) via a merchant site 530. However, it should also be appreciated that the user may enter into a transaction in-person by swiping a payment card, touching a chip, etc. to a point-of-sale (POS) terminal of the merchant. In this example, the computing system 510 is used to enter into a payment transaction with the merchant site 530 based on commands entered into the merchant site 530. The user may enter account information, personal information, biometric information, etc. into the merchant site 530 via a display device 511 of the computing system 510. In addition, a geographic location of the computing system 510.

In response to the request for the payment transaction, the merchant site 530 may generate an authorization request 540 message which includes details of the transaction such as an amount, a sender account, a receiver account, an identifier of the merchant, a location 514 of the computing system 510, and the like. Here, the merchant site 530 transmits the authorization request 540 message to the software application 521 on the host platform 520. In response, the software application 521 analyzes the details of the transaction and dynamically determines at least one type of biometric to request from the user of the computing system 510 to authenticate the transaction based on the details of the transaction. For example, the software application 521 may access rules within a database of biometric rules 522 which include mappings of biometric types to details, risk scores, and the like.

In this example, the software application 521 may communicate directly with the computing system 510 and request the biometric type(s) from the user. For example, the software application 521 may establish a secure direct channel between the software application 521 and the computing system 510 and request the at least one type of biometric via the secure channel. This may be achieved by displaying a pop-up display box, window, etc. over the merchant site 530 on the display device 511 of the computing system 510. The user may enter the biometric samples for the purpose of authenticating the transaction.

Figure 5B:
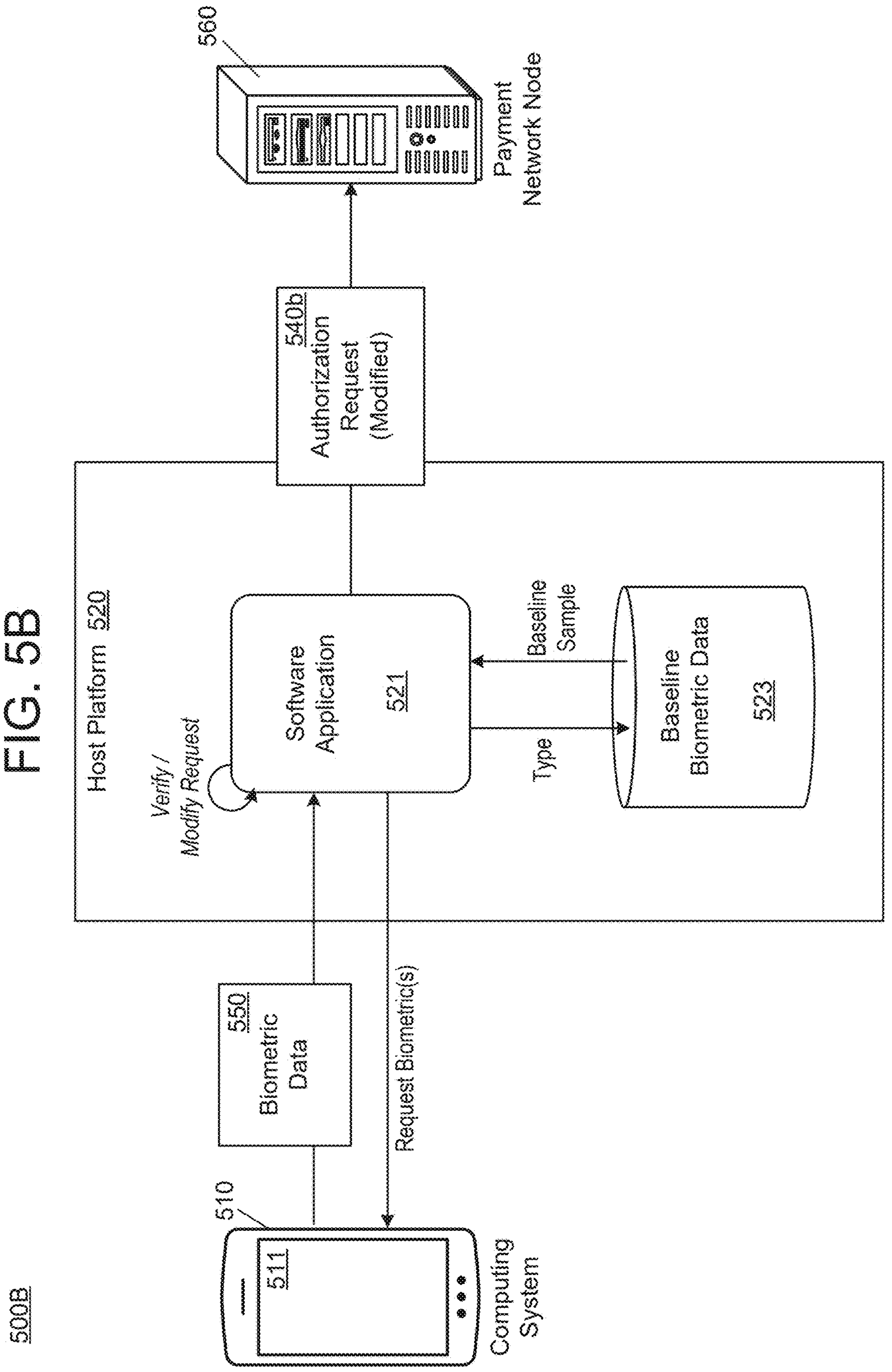
FIG. 5B is a diagram illustrating a process of modifying an authorization request message in response to successful verification of the biometric according to examples and features of the instant solution.

FIG. 5B illustrates a process 500B of modifying an authorization request message in response to successful verification of the biometric according to examples and features of the instant solution. Referring to FIG. 5B, the computing system 510 may submit biometric data 550 (e.g., of the type of biometric requested in FIG. 5A), to the software application 521. In response, the software application 521 may retrieve baseline biometric data of the user from a database of baseline biometric data 523 and compare the biometric data 550 to the baseline biometric data 523 from the database to determine when the user is authentic. Here, the identity of the user may be verified based on the biometric comparison.

As an example, the software application 521 may transmit a request which is displayed on a GUI via a display device 511 of the computing system 510. The request may identify the type of biometric(s) to be submitted by the user, screen content, input mechanisms, functionality, etc. for capturing and submitting biometric data corresponding to the type of biometric(s), and the like.

As another example, rather than request the user to enter the biometrics, the software application 521 may identify a source device associated with the sender/user. For example, the software application 521 may identify the computing system 510 is a registered source device of the sender and may query a storage element on the computing system 510 for previously-stored biometric samples of the user/sender. Here, the storage element may include a secure element chip, a secure folder, and the like, which is previously registered with the software application 521. Here, a location (file path, address, etc.) of the secure storage can be queried by the software application 521 with an identifier of the type of biometric sample of the sender that is needed. In response, the secure storage can respond with the type of biometric sample requested. This obviates the step in which the user provides a real-time biometric input.

In this example, the software application 521 may use an identifier of the user, for example, a username, password, device identifier, software application identifier, and the like, which is unique to the user, to look-up the baseline biometric data from the database of baseline biometric data 523. The software application 521 may use artificial intelligence (not shown) to determine whether the biometric samples are a match. In some examples and features of the instant solution, the software application 521 may use speech recognition, image analysis, brain wave analysis, and the like, to verify the biometric data 550 with respect to the baseline biometric data sample.

Figure 5C:
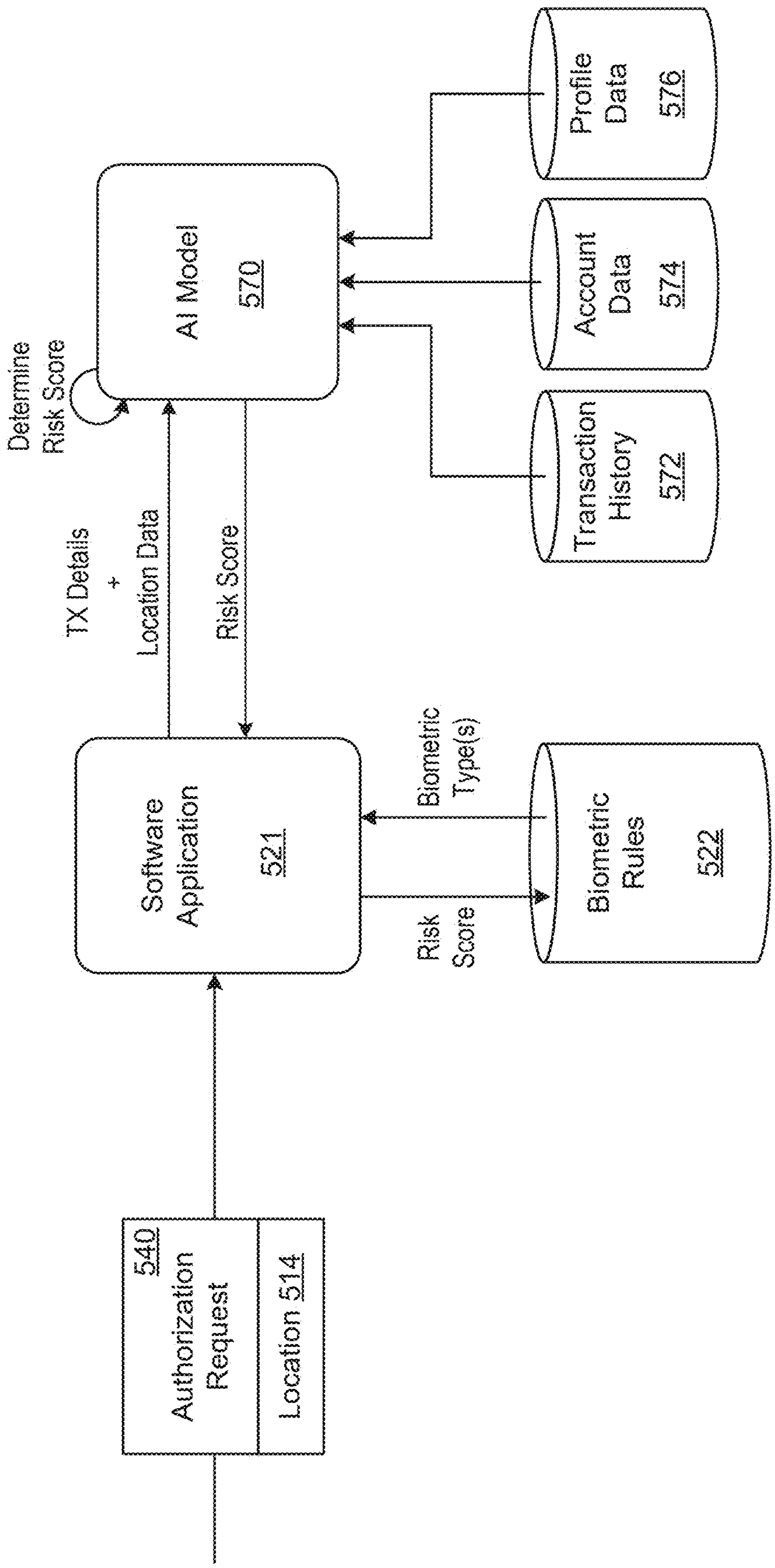
FIG. 5C is a diagram illustrating a process of determining a risk score associated with a transaction according to examples and features of the instant solution.
Figure 5D:
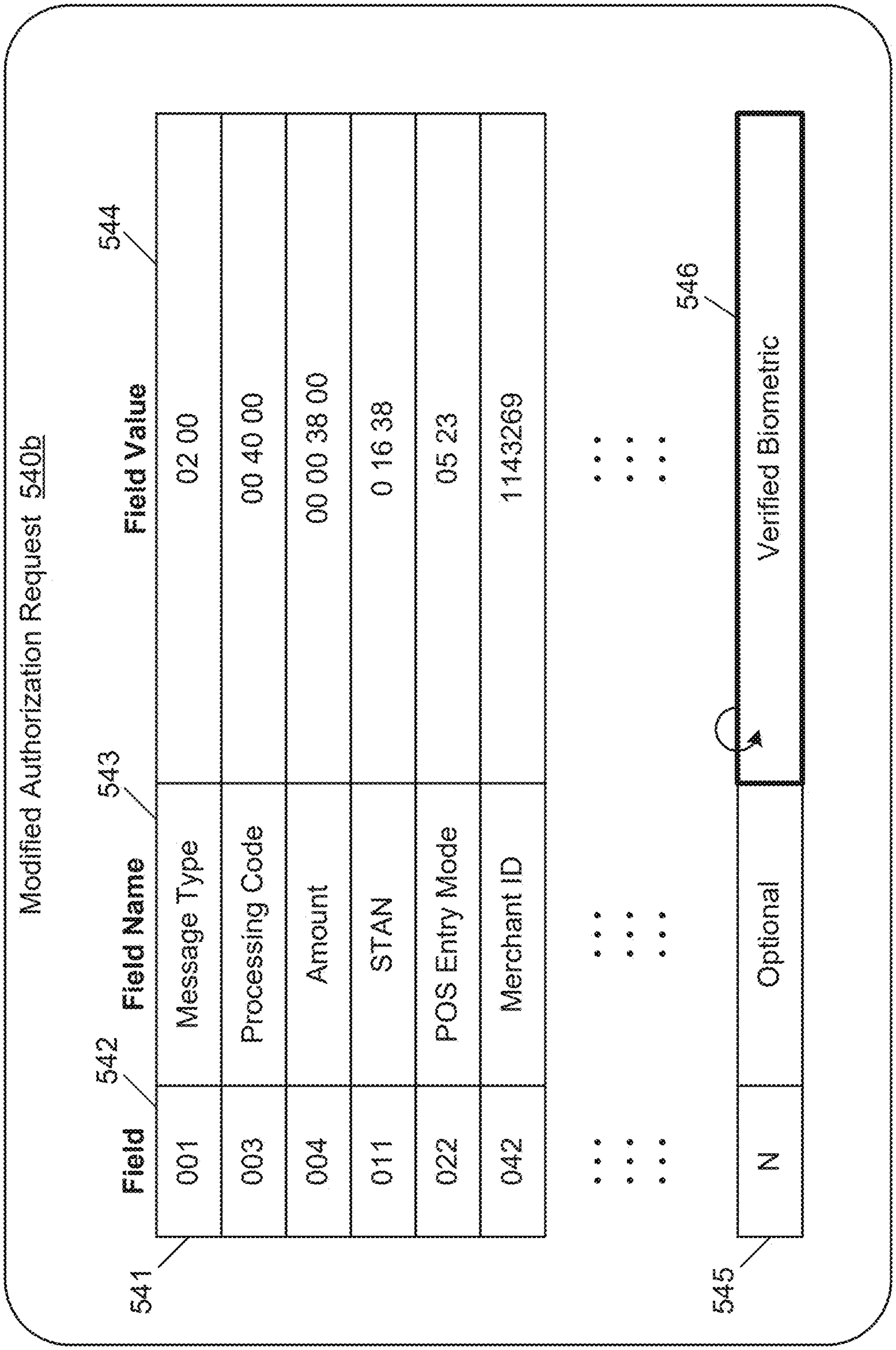
FIG. 5D is a diagram illustrating a process of modifying an authorization request message according to examples and features of the instant solution.

FIG. 5D illustrates a process 500D of modifying an authorization request message according to examples and features of the instant solution. Referring to FIG. 5D, the modified authorization request 540*b* message includes a plurality of rows or entries 541 of data items which include a field 542 identifier, a field name 543, and a field value 544. Here, the field identifiers and the field names will be the same in each authorization request message, however, the values in the field values 544 will be dynamically added to the modified authorization request 540*b* message with details of the specific transaction.

In this case, the software application 521 may modify an entry 545 of an optional field in the authorization request 540 message (see FIGS. 5A, 5C) to include an identifier 546 of the successful verified biometric performed on the user/sender of the transaction to generate the modified authorization request 540*b* message. While an optional field is used in this example, it should be appreciated that other fields may also be used and are not limited to an optional field. In some cases, multiple values may be stored in a same field and downstream nodes may have logic for interpreting the multiple values in the same field.

Referring again to FIG. 5B, upon successful verification, the software application 521 may modify the authorization request 540 message by adding an indicator that indicates the identity of the user has been verified through biometrics to generate a modified authorization request 540*b* message. Furthermore, the software application 521 may provide the modified authorization request 540*b* message to another node in the payment network that is part of the process, for example, an issuer of a payment account being used by the user in the transaction, an acquirer system of the merchant, a payment processor, and the like. By modifying the authorization request message, the system creates verifiable proof that the user has been biometrically authenticated for purposes of verification with the other nodes on the payment network.

FIG. 5C illustrates a process 500C of determining a risk score associated with a transaction according to examples and features of the instant solution. For example, the process 500C may be performed by the software application 521 when dynamically determining the type of biometric(s) to request from the user to authenticate the transaction. Referring to FIG. 5C, the software application 521 may receive the authorization request 540 message, for example, from the merchant site, a merchant POS terminal, from a payment network node 560, and the like, and may determine a risk value/score associated with the transaction based on the details of the transaction within the authorization request 540 message.

According to various examples and features of the instant solution, the software application 521 may invoke an AI model 570 and provide, as input, the transaction details, the location of the computing system 510, and the like, to the AI model 570. In addition, the AI model 570 may ingest transaction history data of the user from a database of transaction history 572, account data of the user from a database of account data 574, profile data of the user from a database of profile data 576, and the like, and use the data to determine a risk score for the transaction. The transaction history data, account data, profile data, and the like, may be used to compare the transaction details to typical transactions performed by the user. Here, a risk score may be generated based on how much risk there is to the host system (e.g., a financial institution which hosts the software application 521) by the transaction.

For example, AI model 570 is an example of AI model 232 (see, for example, FIGS. 2A-2C) and AI model 570 may be trained using historical transaction content and scores assigned to the historical transaction content, historical fraudulent transaction content and scores assigned to the historical fraudulent transaction content, patterns of transaction behavior that are valid, patterns of transaction behavior that are fraud, and the like, which may train the AI model 570 to predict a risk score for a particular transaction. The risk score may be output by the AI model 570 and provided to the software application 521. In response, the software application 521 may use the risk score to identify a type of biometric (or multiple types of biometrics) to request from the user in order to authenticate the transaction.

For example, when the transaction is for a greater amount than the user normally performs, the AI model 570 may determine a higher risk associated with the transaction. The software application 521 may receive the higher risk score and map the score to rules for biometric authentication within the database of biometric rules 522. In this example, the rules may determine that an additional biometric (e.g., at least two biometrics) is to be input by the user for authentication.

Figure 5E:
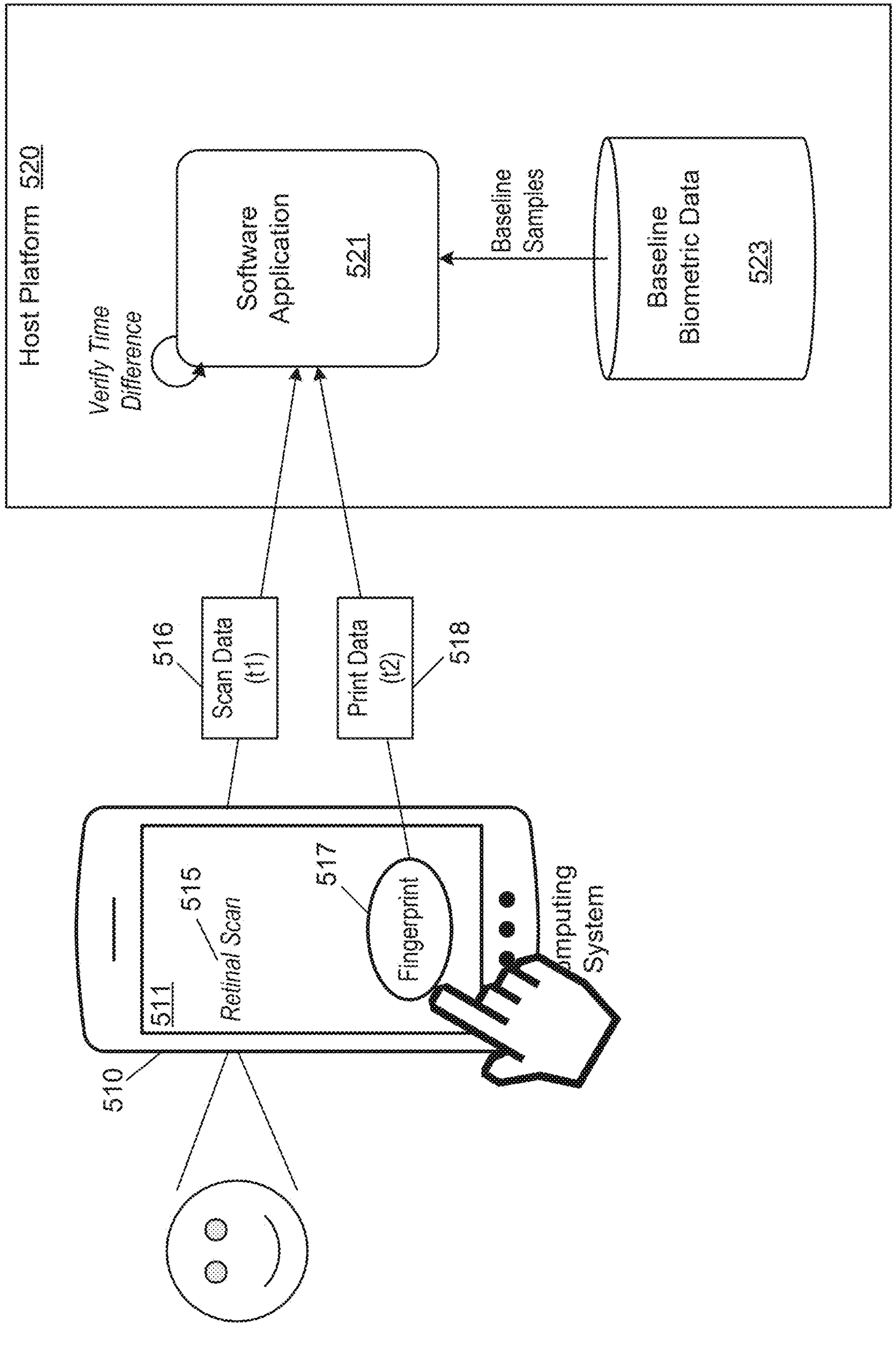
FIG. 5E is a diagram illustrating a process of simultaneously receiving multiple biometric data samples according to examples and features of the instant solution.

FIG. 5E illustrates a process 500E of simultaneously receiving multiple biometric data samples according to examples and features of the instant solution. In some examples and features of the instant solution, the system may request that the user provide multiple types of biometrics (e.g., at least two different types of biometrics) to authenticate the transaction. In some examples and features of the instant solution, the system may request that the two biometrics be provided simultaneously (e.g., within a time threshold) in order for the biometrics to be authenticated. Referring to FIG. 5E, the software application may request both a retinal scan 515 and a fingerprint scan 517 of the user, and both scans are to be performed simultaneously.

Here, the software application 521 may display an input field for the fingerprint scan 517 on a display device 511 of the computing system 510. Furthermore, a camera on the computing system 510 may capture an image of a face of the user at the same time. Here, a retinal scan data 516 may be captured by the camera and sent to the software application 521 and a fingerprint print data 518 may be captured by the display device 511 and sent to the software application 521. Each of the retina scan data 516 and the fingerprint print data 518 may have respective timestamps (e.g., t1 and t2) that are added to the data as it is captured. The software application 521 may receive the biometrics and retrieve corresponding baseline biometrics from the database of baseline biometric data 523 and compare the baseline biometrics to the biometric data to verify the identity of the user.

In addition, the software application 521 may also compare the timestamps between the retinal scan data 516 and the fingerprint print data 518. Here, the software application 521 may determine when the two types of biometrics are captured within a predetermined threshold of time (e.g., within 1 second, 2 seconds, ½ second, etc.) of each other to ensure that the two types of biometrics are captured simultaneously. When both are captured simultaneously and the biometric samples match the baseline biometrics, the identity of the user may be verified. When either the baseline biometric data is not a match or the biometric data scans are not captured simultaneously, the software application may determine that the user is not verified and may cancel the transaction or may request additional verifications.

Although not shown in FIG. 5E, the biometric data provided by the user from the computing system 510 may be verified using an AI model, for example, the AI model 427 shown in FIG. 4D which can output a confidence score indicating how likely the biometric data from the user matches the baseline biometric data of the user previously registered with the system.

In one example of the instant solution, real-time adaptation is utilized, where the AI model adjusts the type and stringency of the biometric verification based on past transaction behaviors of a current user. The AI model is responsible for selecting and verifying biometrics. In this configuration, the AI model learns from previous transaction data, refining its parameters to understand user behavior and preferences with higher accuracy. This model adjusts the type and stringency of the biometric verification based on transaction patterns, risk levels, and user-specific deviations. For example, when the instant solution detects that the user authorizes lower-value transactions with fingerprint verification, the instant solution may require facial recognition when a high-value transaction occurs (e.g., greater than a threshold) or may require multi-factor biometrics when a high-value transaction occurs at a new location or a location determined to be problematic. These are examples of a deviation from a user's typical behavior.

In another example of the instant solution, real-time adaptation is utilized, where the AI model adjusts the type and stringency of the biometric verification based on current transaction behaviors of other users with similar profiles and/or characteristics of the instant user. The AI model is responsible for selecting and verifying biometrics. In this configuration, the AI model learns from the current transaction data of the other users, refining its parameters to understand similarities between the other users and the instant user. This model adjusts the type and stringency of the biometric verification based on these similarities (and/or differences) to determine transaction patterns, risk levels, and user-specific deviations. For example, when the instant solution detects that the user authorizes lower-value transactions with fingerprint verification, the instant solution may require facial recognition when a high-value transaction occurs (e.g., greater than a threshold) or may require multi-factor biometrics when the other users also require this type of biometric to be used.

The adaptive biometric model of the instant solution is used with the memory and processor herein, where the processor queries the AI model to determine the most suitable biometric type based on real-time analysis. This analysis considers parameters such as transaction history, user risk profiles, and temporal factors, among others. Once a specific biometric type is identified, the solution prompts the user via the software application to provide the required biometric input. Upon receiving the biometric data, the model compares it to the updated baseline biometric data, which also evolves as the AI learns from each transaction.

In another example of the instant solution, Internet of Things (IOT) devices are utilized with the verification process, adding an additional layer of security. This example involves IoT devices such as biometric-enabled wearables, which capture real-time biometric data and send it to the instant solution for verification, which is useful for context-aware verification in mobile transactions. Communication is established between the instant solution and IoT devices worn or used by the user. In this example, the processor of the instant solution is configured to detect and connect with biometric-enabled wearables (or mobile devices that contain sensors) for capturing biometric data like heart rate, fingerprint, or facial recognition. When a transaction is initiated, the instant processor queries these IoT devices to collect real-time biometric inputs, ensuring a more context-aware verification process.

The instant solution leverages IoT devices to capture dynamic biometric data, which adds an added layer of security by validating the user's identity based on their physical presence and recent biometric metrics. The processor then compares this biometric data against baseline data stored in the memory. The IoT-enabled verification enhances security and allows for adaptive verification, such as requiring biometric inputs simultaneously from the user's wearable device and most used device (e.g., mobile phone), thereby strengthening the authentication process for high-risk or unusual transactions.

In another example of the instant solution, an AI model is used to predict characteristics of a next activity that will involve a biometric and predict a type of the activity. This AI model is trained with data from the user and/or other users that have similar characteristics, profiles, etc., and the model is executed to make such predictions.

In another example of the instant solution, one or more explainable AI (XAI) techniques, interpretable AI, or explainable machine learning (XML) implemented within biometric verification systems are used with the instant solution.

The XAI techniques provide clear, interpretable insights into why specific biometrics were chosen or rejected. An explainability layer is embedded within one or more modules or nodes of the instant solution and is responsible for biometric selection and verification. A processor in the one or more modules or nodes of the instant solution (for example, any module or node depicted in FIGS. 1, 2A-2C, 3, 4A-4D, 5A-5C, 5E, and 8) utilizes XAI techniques to provide transparent insights into the decision-making process when selecting and verifying biometrics. As the instant solution determines which biometrics to use based on transaction details, the XAI techniques generate interpretable explanations detailing why a particular biometric type was selected and how it contributed to verifying the user's identity.

The instant solution utilizes XAI techniques to provide transparency in the biometric and digital signature verification processes. As the processor dynamically determines which biometric to use based on document content, the XAI techniques generate interpretable insights that explain this selection, detailing factors such as document type, user behavior, and/or risk level. During the verification of biometric data and digital signatures, XAI techniques produce explanations showing how the comparisons were made relative to baseline data and signature verification criteria. These explanations can be presented to users or auditors through the software application, enhancing transparency and trust. Once verification is complete, the processor edits the digital document to reflect its validity, with an option for users to review how the validation was determined, ensuring the process is understandable and accountable.

For example, when the AI model determines that a fingerprint scan is required instead of facial recognition for a high-risk transaction, the XAI techniques explain this decision in terms of past user behavior, the transaction's risk level, or recent deviations in user patterns. This explanation may be communicated to the user through the software application's interface, offering a clear rationale that enhances user trust and aligns with regulatory compliance requirements.

In one example, the implementation of XAI techniques involve the processor generating a confidence score for each verification step, coupled with explanations such as feature importance charts or decision trees, making the verification process more understandable for users and auditors. In a further example, the processor may consider a threshold for the confidence score for each verification step and may determine a valid verification when the confidence for each verification is at or above the threshold. When one or more of the confidence scores for one or more verifications, respectfully, is/are below the threshold, the processor may determine a valid verification when the score was below the threshold by a certain amount or a certain level, and/or when the verification step is not considered critical for the instant activity (for example, a time of day, etc.).

In another example, the instant solution employs AI algorithms (trained and/or executed by the one or more instant modules) to identify transaction-specific risks and select a predefined code accordingly. This code is inserted into a designated field of the authorization message to indicate successful identity verification. One or more of the instant modules analyze transaction details received in the authorization request message to determine the appropriate predefined code for insertion. The one or more modules assess factors such as transaction type, risk levels, and sender identity verification status to select the correct predefined code dynamically. The one or more modules insert this code into the predefined field of the authorization request message. Once modified, the message is transmitted to one or more of the instant modules for further processing.

In a further example, the instant solution employs AI algorithms to identify transaction-specific risks and generate a dynamic code accordingly. This code is inserted into a revolving field of the authorization message to indicate successful identity verification. One or more of the instant modules analyze transaction details received in the authorization request message to generate the dynamic code for insertion. The one or more modules assess factors such as transaction type, risk levels, and sender identity verification status to generate the dynamic code. The one or more modules insert this code into the predefined field of the authorization request message. Once modified, the message is transmitted to one or more of the instant modules for further processing.

In another example, based on user behavior, the instant solution adjusts the type and placement of predefined codes in the authorization message to ensure that the code reflects updated security protocols for transaction validation. Adaptive security protocols adjust the predefined code based on evolving security measures and user behavior patterns. These predefined code is utilized by the processor to evaluate prior transaction data, such as frequency, value, and user behavior, to determine the level of security needed. It then selects and inserts a corresponding predefined code in the authorization message, reflecting the latest security protocols for the given transaction.

Figure 6A:
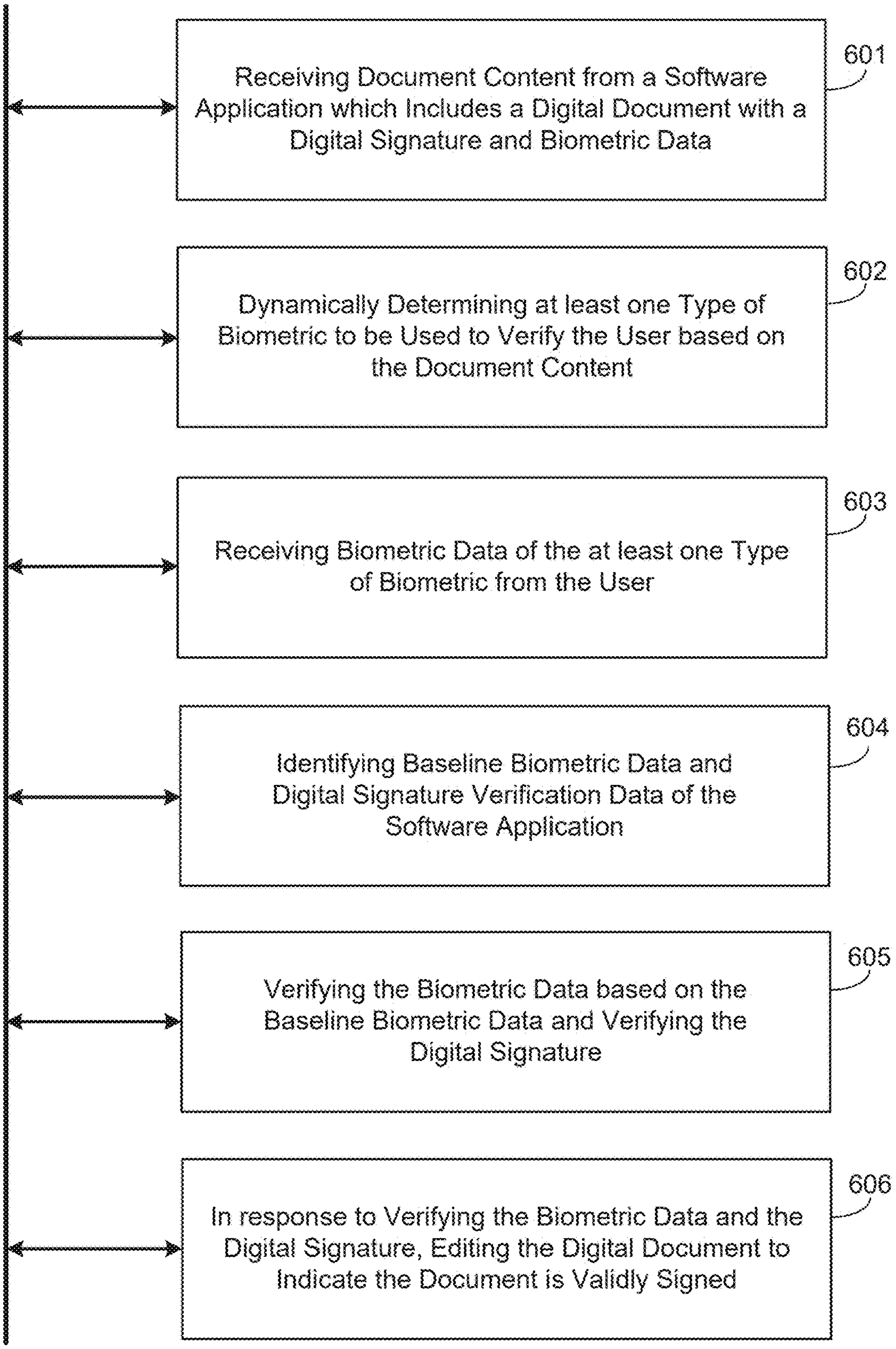
FIG. 6A is a diagram illustrating a method of verifying a digital signature based on biometric data according to examples and features of the instant solution.

FIG. 6A illustrates a method 600 of verifying a digital signature based on biometric data according to examples and features of the instant solution. For example, the method 600 may be performed by a software application, host platform such as a cloud platform, a web server, a distributed system, a combination of systems, and the like. Referring to FIG. 6A, in 601, the method may include receiving document content from a software application, the document content comprising a digital document with a digital signature of a user embedded therein. In 602, the method may include dynamically determining at least one type of biometric to be used to verify the user based on the document content. In 603, the method may include receiving biometric data of the at least one type of biometric from a device of the user based on an input via the software application. In 604, the method may include identifying a baseline biometric data and digital signature verification data associated with the software application based on a unique identifier of the software application. In 605, the method may include verifying the biometric data based on a comparison of the biometric data to the baseline biometric data and verifying the digital signature based on the digital signature verification data. In 606, the method may include, in response to verifying the biometric data and the digital signature, editing the digital document to indicate the digital document is validly signed.

Figure 6B:
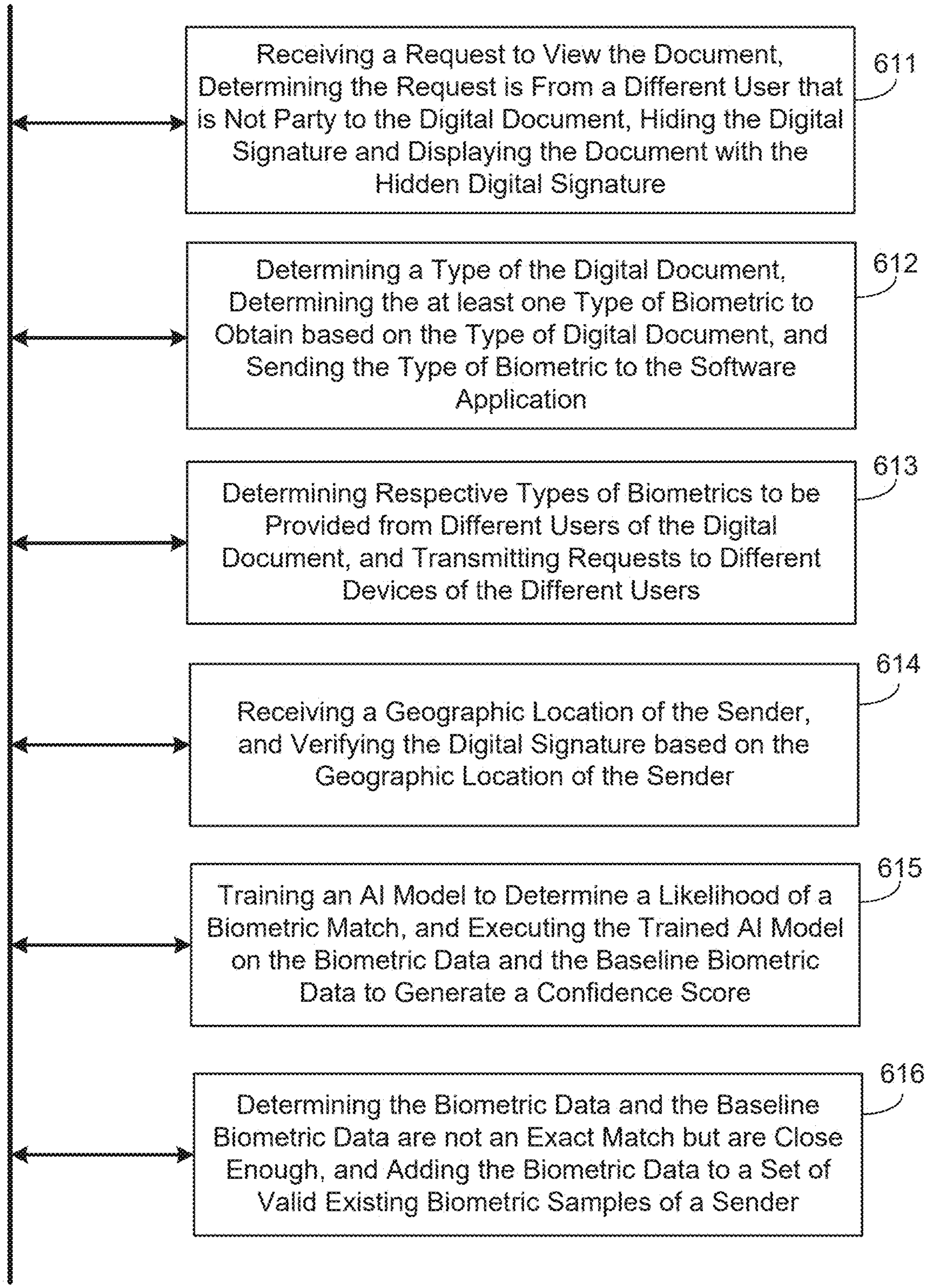
FIG. 6B is a diagram illustrating a method of verifying a digital signature based on biometric data according to additional examples and features of the instant solution.

FIG. 6B illustrates a method 610 of verifying a digital signature based on biometric data according to additional examples and features of the instant solution. For example, the method 610 may be performed by a software application, host platform such as a cloud platform, a web server, a distributed system, a combination of systems, and the like. Referring to FIG. 6B, in 611, the method may include receiving a request to view the digital document, determining that the request is from a different user that is not a party to the digital document, and in response, hiding the digital signature and displaying the digital document with the digital signature hidden. In 612, the method may include determining a type of the digital document based on document content within the digital document, determining the at least one type of biometric data to obtain based on the type of the digital document, and sending a request to the software application with an identifier of the at least one type of biometric data to obtain prior to receiving the biometric data. In 613, the digital document may include different digital signatures of different users, respectively, and the method further comprises determining a type of the digital document, determining respective types of biometric data to be provided by each of the different users based on the type of the digital document, and transmitting requests to different devices of the different users, respectively, with indicators of the respective types of biometric data to be provided. In 614, the method may include receiving a geographic location of a device associated with the biometric data from the software application, and the verifying the digital signature further comprises verifying the geographic location of the device based on previous geographic locations of the device registered by the software application. In 615, the method may include training an artificial intelligence (AI) model with neural network capability to determine a likelihood of a match between a biometric sample and a baseline biometric sample based on at least one of input biometric data samples, baseline biometric data samples matched with the input biometric data samples, and model feedback data, wherein the verifying comprises executing the trained AI model on the biometric data and the baseline biometric data to generate a confidence score. In 616, the method may include determining that the biometric data and the baseline biometric data are not identical but are within a threshold of similarity to be considered a match based on the confidence score generated by the AI model, and in response, adding the biometric data and the confidence score as an additional biometric sample to a set of valid existing biometric samples related to the biometric data.

Figure 7A:
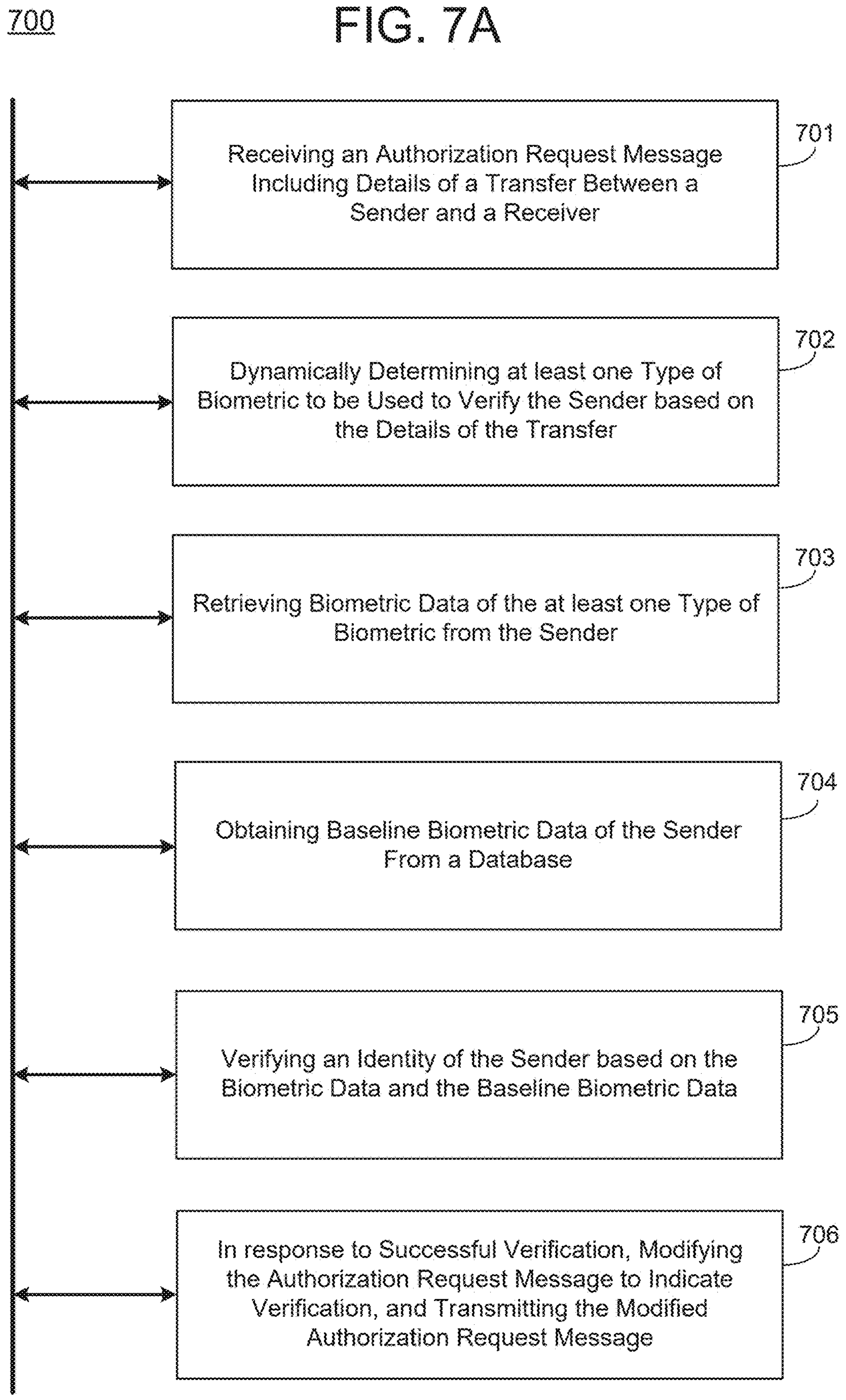
FIG. 7A is a diagram illustrating a method of verifying a transaction based on dynamically selected biometric data according to examples and features of the instant solution.

FIG. 7A illustrates a method 700 of verifying a transaction based on dynamically selected biometric data according to examples and features of the instant solution. For example, the method 700 may be performed by a software application, host platform such as a cloud platform, a web server, a distributed system, a combination of systems, and the like. Referring to FIG. 7A, in 701, the method may include receiving an authorization request message from a computer network, the authorization request message comprising details of a data transfer from a sender to a receiver. In 702, the method may include dynamically determining at least one type of biometric to be used to verify the sender based on the details of the data transfer. In 703, the method may include receiving biometric data of the at least one type of biometric from the sender based on an input via a software application. In 704, the method may include obtaining baseline biometric data of the sender from a database. In 705, the method may include verifying an identity of the sender based on a comparison of the biometric data and the baseline biometric data. In 706, in response to successful verification of the identity of the sender, the method may include modifying the authorization request message to indicate the identity of the sender is verified, and transmitting the modified authorization request message to a computing node in the computer network to perform the data transfer.

Figure 7B:
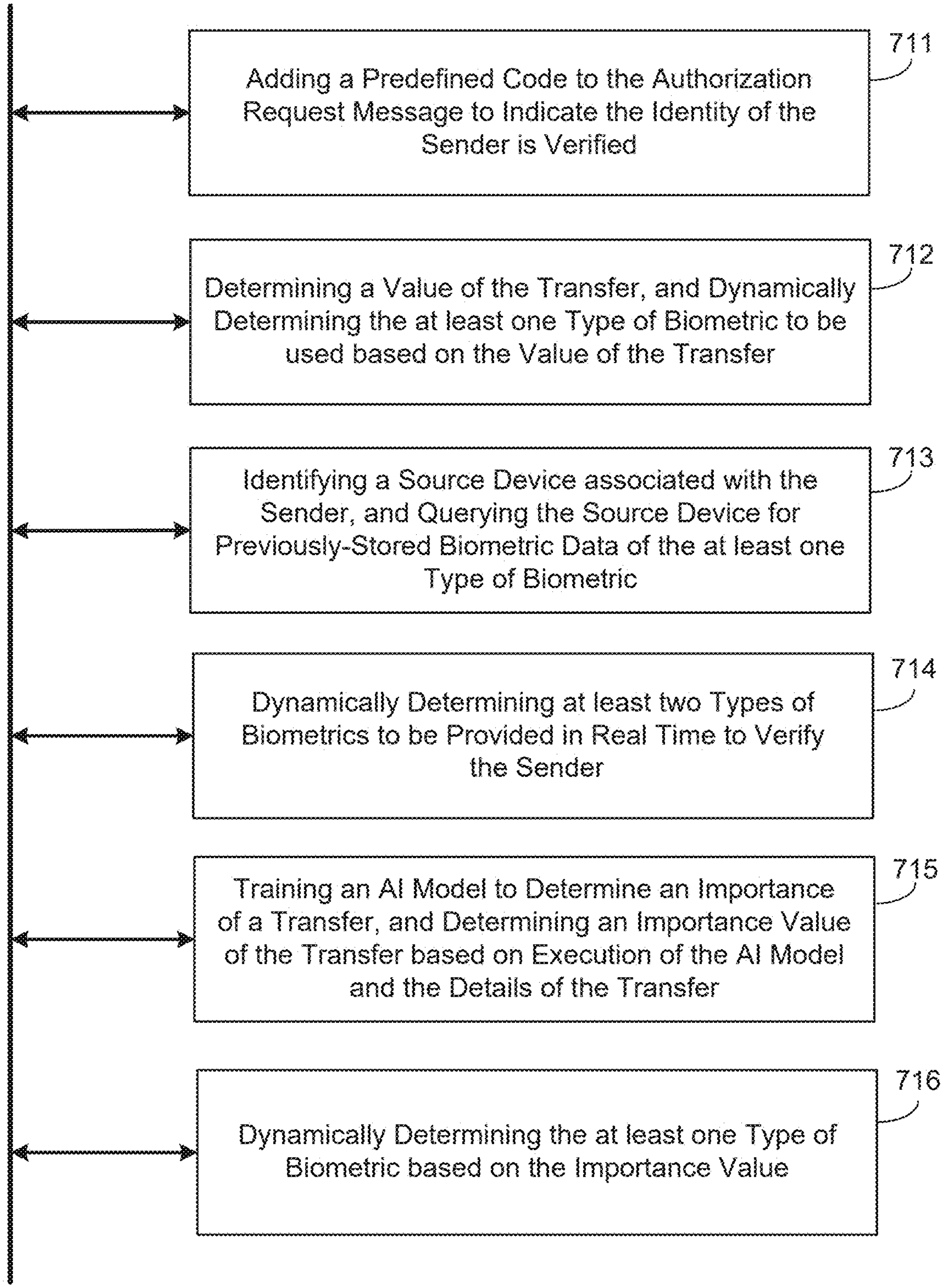
FIG. 7B is a diagram illustrating a method of verifying a transaction based on dynamically selected biometric data according to additional examples and features of the instant solution.

FIG. 7B illustrates a method 710 of verifying a transaction based on dynamically selected biometric data according to examples and features of the instant solution. For example, the method 710 may be performed by a software application, host platform such as a cloud platform, a web server, a distributed system, a combination of systems, and the like. Referring to FIG. 7B, in 711, the method may include adding a predefined code into a predefined field of the authorization request message to indicate the identity of the sender is verified, and transmitting the modified authorization request message to the computing node. In 712, the method may include reading the details of the data transfer from the authorization request message, and determining a value of the data transfer from the details, wherein the dynamically determining the at least one type of biometric data comprises dynamically determining the at least one type of biometric based on the value of the data transfer. In 713, the method may include identifying a source device associated with the sender based on an identifier of the sender included in the authorization request message, wherein the receiving the biometric data comprises querying the source device for previously-stored biometric data of the at least one type of biometric which has been previously stored on the source device. In 714, the method may include dynamically determining at least two types of biometrics that are to be provided in real time to verify the sender based on the details of the transfer, which may be a data transfer. In 715, the method may include training an artificial intelligence (AI) model with neural network capability to determine an importance of the transfer based on at least one of details of historical transfers, importance values assigned to the historical transfers, and model feedback data, and executing the trained AI model on the details of the transfer to determine an importance value of the transfer. In 716, the method may include dynamically determining the at least one type of biometric to be used to verify the sender based on the importance value of the transfer.

Figure 8:
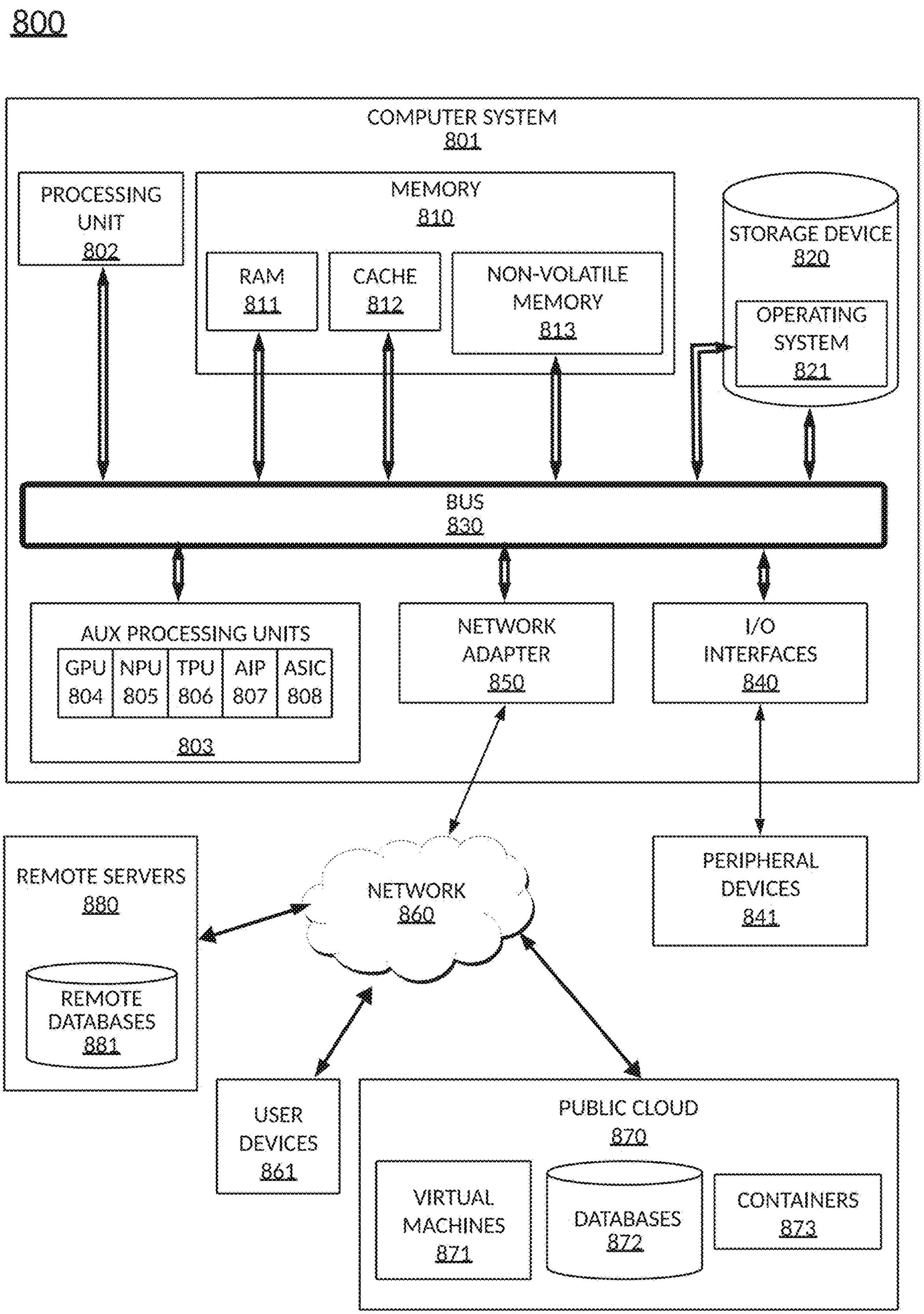
FIG. 8 is a system diagram illustrating a computing environment according to the instant solution's example features, structures, or characteristics.

The examples and features of the instant solution may be implemented in at least one of the elements described or depicted herein, including for example, the elements described or depicted in FIG. 8. These examples and features may further be implemented in hardware, in a computer program executed by a processor, in firmware, or in a combination of the above. A computer program may be embodied on a computer readable medium, such as a storage medium. For example, a computer program may reside in random access memory (RAM), flash memory, read-only memory (ROM), erasable programmable read-only memory (EPROM), electrically erasable programmable read-only memory (EEPROM), registers, hard disk, a removable disk, a compact disk read-only memory (CD-ROM), or any other form of storage medium known in the art.

An exemplary storage medium may be communicatively coupled to the processor such that the processor may read information from, and write information to, the storage medium. In the alternative, the storage medium may be integral to the processor. The processor and the storage medium may reside in an application specific integrated circuit (ASIC). In the alternative, the processor and the storage medium may reside as discrete components. For example, FIG. 8 illustrates an example computer system architecture, which may represent or be integrated in any of the above-described components, etc.

FIG. 8 illustrates a computing environment according to the instant solution's example features, structures, or characteristics. FIG. 8 is not intended to suggest any limitation as to the scope of use or functionality of features, structures, or characteristics of the instant solution of the application described herein. Regardless, the computing environment 800 can be implemented to perform any of the functionalities described herein. In computing environment 800, there is a computer system 801, operational within numerous other general-purpose or special-purpose computing system environments or configurations.

Computer system 801 may take the form of a desktop computer, laptop computer, tablet computer, smartphone, smartwatch or other wearable computer, server computer system, thin client, thick client, network computer system, minicomputer system, mainframe computer, quantum computer, and distributed cloud computing environment that include any of the described systems or devices, and the like or any other form of computer or mobile device now known or to be developed in the future that is capable of running a program, accessing a network 860 or querying a database. Depending upon the technology, the performance of a computer-implemented method may be distributed among multiple computers and among multiple locations. However, in this presentation of the computing environment 800, a detailed discussion is focused on a single computer, specifically computer system 801, to keep the presentation as simple as possible.

Computer system 801 may be located in a cloud, even though it is not shown in a cloud in FIG. 8. On the other hand, computer system 801 may not be in a cloud except to any extent as may be affirmatively indicated. Computer system 801 may be described in the general context of computer system-executable instructions, such as program modules, executed by a computer system 801. Generally, program modules may include routines, programs, objects, components, logic, data structures, and so on that perform tasks or implement certain abstract data types. As shown in FIG. 8, computer system 801 in computing environment 800 is shown in the form of a general-purpose computing device. The components of computer system 801 may include but are not limited to, at least one processor or processing unit 802, a system memory 810, and a bus 830 that couples various system components, including system memory 810 to processing unit 802.

Processing unit 802 includes at least one computer processor of any type now known or to be developed. The processing unit 802 may contain circuitry distributed over multiple integrated circuit chips. The processing unit 802 may also implement multiple processor threads and multiple processor cores. Cache 812 is a memory that may be in the processor chip package(s) or located "off-chip," as depicted in FIG. 8. Cache 812 is typically used for data or code accessed by the threads or cores running on the processing unit 802. In some computing environments, processing unit 802 may be designed to work with qubits and perform quantum computing.

The Auxiliary Processing Units (APU) 803 may contain at least one Graphics Processing Unit (GPU) 804, Neural Processing Unit (NPU) 805, Tensor Processing Unit (TPU) 806, AI Processor (AIP) 807, or other Application Specific Integrated Circuit (ASIC) 808. The at least one APU 803 may contain circuitry distributed over multiple integrated circuit chips. Each APU 803 may implement multiple processor threads and multiple processor cores. Each APU 803 may include at least one of onboard memory, onboard memory cache, and onboard instruction cache. Each APU may be communicatively coupled to the system bus 830 and configure to communicate with other system components, including a processing unit 802, system cache 812, RAM 811, non-volatile RAM 813, operating system 821, Network adapter 850, and Input/Output interfaces 840. In some computing environments, at least one of the at least one APU 803 may be designed to work with qubits and perform quantum computing.

Memory 810 is any volatile memory now known or to be developed in the future. Examples include dynamic random-access memory (RAM) 811 or static type RAM 811. Typically, the volatile memory is characterized by random access, but this may not be the characterization unless affirmatively indicated. In computer system 801, memory 810 is in a single package. It is internal to computer system 801, but alternatively or additionally, the volatile memory may be distributed over multiple packages and/or located externally with respect to computer system 801. By way of example, memory 810 can be provided for reading from and writing to a non-removable, non-volatile magnetic media (shown as storage device 820, and typically called a "hard drive"). Memory 810 may include at least one program product having a set (e.g., at least one) of program modules configured to carry out the functions of various features, structures, or characteristics of the instant solution of the application. A typical computer system 801 may include cache 812, a specialized volatile memory generally faster than RAM 811 and generally located closer to the processing unit 802. Cache 812 stores frequently accessed data and instructions accessed by the processing unit 802 to speed up processing time. The computer system 801 may also include non-volatile memory 813 in the form of ROM, PROM, EEPROM, and flash memory. Non-volatile memory 813 often contains programming instructions for starting the computer, including the basic input/output system (BIOS) and information to start the operating system 821.

Computer system 801 may include a removable/non-removable, volatile/non-volatile computer storage device 820. For example, storage device 820 can be a non-removable, non-volatile magnetic media (not shown and typically called a "hard drive"). At least one data interface can connect it to the bus 830. In features, structures, or characteristics of the instant solution where computer system 801 has a large amount of storage (for example, where computer system 801 locally stores and manages a large database), then this storage may be provided by peripheral storage devices 820 designed for storing very large amounts of data, such as a storage area network (SAN) that is shared by multiple, geographically distributed computers.

The operating system 821 is software that manages computer system 801 hardware resources and provides common services for computer programs. Operating system 821 may take several forms, such as various known proprietary operating systems or open-source Portable Operating System Interface type operating systems that employ a kernel.

The bus 830 represents at least one of several types of bus structures, including a memory bus or memory controller, a peripheral bus, an accelerated graphics port, and a processor or local bus using various bus architectures. By way of example, and not limitation, such architectures include Industry Standard Architecture (ISA) buses, Micro Channel Architecture (MCA) buses, Enhanced ISA (EISA) buses, Video Electronics Standards Association (VESA) local buses, and Peripheral Component Interconnect (PCI) bus. The bus 830 is the signal conduction path that allows the various components of computer system 801 to communicate.

Computer system 801 may communicate with at least one peripheral device, 841, via an input/output (I/O) interface, 840. Such devices may include a keyboard, a pointing device, a display, etc. ; at least one device that enables a user to interact with computer system 801; and/or any devices (e.g., network card, modem, etc.) that enable computer system 801 to communicate with at least one other computing devices. Such communication can occur via I/O interface 840. As depicted, I/O interface 840 communicates with the other components of computer system 801 via bus 830.

Network adapter 850 enables the computer system 801 to connect and communicate with at least one network 860, such as a local area network (LAN), a wide area network (WAN), and/or a public network (e.g., the Internet). It bridges the computer's internal bus 830 and the external network, exchanging data efficiently and reliably. The network adapter 850 may include hardware, such as modems or Wi-Fi signal transceivers, and software for packetizing and/or de-packetizing data for communication network transmission. Network adapter 850 supports various communication protocols to ensure compatibility with network standards. Ethernet connections adhere to protocols such as IEEE 802.3, while wireless communications might support IEEE 802.11 standards, Bluetooth, near-field communication (NFC), or other network wireless radio standards.

Network 860 is any computer network that can receive and/or transmit data. Network 860 can include a WAN, LAN, private cloud, or public Internet, capable of communicating computer data over non-local distances by any technology that is now known or to be developed in the future. Any connection depicted can be wired and/or wireless and may traverse other components that are not shown. In some features, structures, or characteristics of the instant solution, a network 860 may be replaced and/or supplemented by LANs designed to communicate data between devices in a local area, such as a Wi-Fi network. The network 860 typically includes computer hardware such as copper transmission cables, optical transmission fibers, wireless transmission, routers, firewalls, switches, gateway computers, edge servers, and network infrastructure known now or to be developed in the future. Computer system 801 connects to network 860 via network adapter 850 and bus 830.

User devices 861 are any computer systems used and controlled by an end user in connection with computer system 801. For example, in a hypothetical case where computer system 801 is designed to provide a recommendation to an end user, this recommendation may typically be communicated from network adapter 850 of computer system 801 through network 860 to a user device 861, allowing user device 861 to display, or otherwise present, the recommendation to an end user. User devices can be a wide array, including personal computers, laptops, tablets, hand-held, mobile phones, etc.

A public cloud 870 is an on-demand availability of computer system resources, including data storage and computing power, without direct active management by the user. Public clouds 870 are often distributed, with data centers in multiple locations for availability and performance. Computing resources on public clouds 870 are shared across multiple tenants through virtual computing environments comprising virtual machines 871, databases 872, containers 873, and other resources. A container 873 is an isolated, lightweight software for running a software application on the host operating system 821. Containers 873 are built on top of the host operating system's kernel and contain software applications and some lightweight operating system APIs and services. In contrast, virtual machine 871 is a software layer with an operating system 821 and kernel. Virtual machines 871 are built on top of a hypervisor emulation layer designed to abstract a host computer's hardware from the operating software environment. Public clouds 870 generally offers databases 872, abstracting high-level database management activities. At least one element described or depicted in FIG. 8 can perform at least one of the actions, functionalities, or features described or depicted herein.

Remote servers 880 are any computers that serve at least some data and/or functionality over a network 860, for example, WAN, a virtual private network (VPN), a private cloud, or via the Internet to computer system 801. These networks 860 may communicate with a LAN to reach users. The user interface may include a web browser or a software application that facilitates communication between the user and remote data. Such software applications have been referred to as "thin" desktop software applications or "thin clients." Thin clients typically incorporate software programs to emulate desktop sessions. Mobile device software applications can also be used. Remote servers 880 can also host remote databases 881, with the database located on one remote server 880 or distributed across multiple remote servers 880. Remote databases 881 are accessible from database client applications installed locally on the remote server 880, other remote servers 880, user devices 861, or computer system 801 across a network 860. An AI/ML model described or depicted here may reside fully or partially on any of the elements described or depicted in FIG. 8.

Although an exemplary example of the instant solution of at least one of an apparatus, method, and computer readable medium has been illustrated in the accompanying drawings and described in the foregoing detailed description, it will be understood that the instant solution is not limited to the examples of the instant solution disclosed but is capable of numerous rearrangements, modifications, and substitutions as set forth and defined by the following claims. For example, the instant solution's capabilities of the various figures can be performed by at least one of the modules or components described herein or in a distributed architecture and may include a transmitter, receiver, or pair of both. For example, all or part of the functionality performed by the individual modules may be performed by at least one of these modules. Further, the functionality described herein may be performed at various times and in relation to various events, internal or external to the modules or components. Also, the information sent between various modules can be sent between the modules via at least one of a data network, the Internet, a voice network, an Internet Protocol network, a wireless device, a wired device and/or via a plurality of protocols. Also, the messages sent or received by any of the modules may be sent or received directly and/or via at least one of the other modules.

One skilled in the art will appreciate that the instant solution may be embodied as a personal computer, a server, a console, a personal digital assistant (PDA), a cell phone, a tablet computing device, a smartphone, or any other suitable computing device, or combination of devices. Presenting the above-described functions as being performed by the instant solution is not intended to limit the scope of the present instant solution in any way but is intended to provide one example of the many examples of the instant solution. Indeed, methods, systems, and apparatuses disclosed herein may be implemented in localized and distributed forms consistent with computing technology.

It should be noted that some of the instant solution features described in this specification have been presented as modules in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise at least one physical or logical block of computer instructions that may, for instance, be organized as an object, procedure, or function. Nevertheless, the executables of an identified module may not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory, tape, or any other such medium used to store data.

Indeed, a module of executable code may be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the instant solution, as generally described and illustrated in the figures herein, may be arranged and designed in a wide variety of different configurations. Thus, the detailed descriptions of the instant solution and the examples and features of the instant solution are not intended to limit the scope of the instant solution as claimed but are merely representative examples of the instant solution.

One having ordinary skill in the art will readily understand that the above may be practiced with steps in a different order and/or with hardware elements in configurations that are different from those which are disclosed. Therefore, although the instant solution has been described based upon these preferred examples and features of the instant solution, it would be apparent to those of skill in the art that certain modifications, variations, and alternative constructions would be apparent.

While preferred examples of the present instant solution have been described, it is to be understood that the examples described are illustrative only, and the scope of the instant solution is to be defined solely by the appended claims when considered with a full range of equivalents and modifications (e.g., protocols, hardware devices, software platforms, etc.) thereto.

What is claimed is:

1. An apparatus, comprising:

a memory; and a processor communicatively coupled to the memory, the processor configured to receive an authorization request message comprising details of a data transfer from a sender to a receiver, execute an artificial intelligence (AI) model on the details of the data transfer to generate an importance metric of the data transfer, determine at least one type of biometric to use for verification of the data transfer based on the importance metric;

receive biometric data of the at least one type of biometric from the sender via a software application, verify an identity of the sender based on a comparison of the biometric data and baseline biometric data of the sender, and in response to successful verification, modify the authorization request message to indicate successful identity verification, and transmit the modified authorization request message to a downstream computing node to perform the data transfer.

2. The apparatus of claim 1, wherein the processor is configured to add a predefined code into a predefined field of the authorization request message to indicate the identity of the sender is verified, and transmit the modified authorization request message to the computing node, wherein an artificial intelligence agent performs an action based on the modified authorization request message.

3. The apparatus of claim 1, wherein the processor is further configured to read the details of the data transfer from the authorization request message, determine an attribute of the data transfer from the details, and determine the at least one type of biometric based on the attribute of the data transfer.

4. The apparatus of claim 1, wherein the processor is further configured to identify a source device associated with the sender based on an identifier of the sender included in the authorization request message, and query the source device for previously-stored biometric data of the at least one type of biometric which has been previously stored on the source device.

5. The apparatus of claim 1, wherein the processor is configured to determine at least two types of biometrics to be provided in real time to verify the sender based on the details of the data transfer.

6. The apparatus of claim 1, wherein the processor is further configured to train the AI model with a neural network capability to determine the importance metric of the data transfer based on at least one of details of historical data transfers, importance metrics assigned to the historical data transfers, and model feedback data.

7. The apparatus of claim 1, wherein the processor is configured to execute the AI model on the biometric data and the baseline biometric data to generate a confidence score and compare the confidence score to a threshold to determine successful verification.

8. The apparatus of claim 1, wherein the processor is configured to generate a hash of the biometric data, and modify the authorization request message to include the hash within a field thereof to generate the modified request message.

9. The apparatus of claim 1, wherein the processor is configured to modify the authorization request message to include an authentication code within a dual-value field of the authorization request message to generate the modified request message.

10. A method comprising:

receiving an authorization request message comprising details of a data transfer from a sender to a receiver;

executing an artificial intelligence (AI) model on the details of the data transfer to generate an importance metric of the data transfer;

determining at least one type of biometric to use for verification of the data transfer based on the importance metric;

receiving biometric data of the at least one type of biometric from the sender via a software application;

verifying an identity of the sender based on a comparison of the biometric data and baseline biometric data of the sender; and in response to successful verification, modifying the authorization request message to indicate successful identity verification, and transmitting the modified authorization request message to a downstream computing node to perform the data transfer.

11. The method of claim 10, wherein the modifying comprises adding a predefined code into a predefined field of the authorization request message to indicate the identity of the sender is verified, and the transmitting comprises transmitting the modified authorization request message to the computing node, wherein an artificial intelligence agent performs an action based on the modified authorization request message.

12. The method of claim 10, further comprising reading the details of the data transfer from the authorization request message, and determining an attribute of the data transfer from the details, wherein the dynamically determining the at least one type of biometric data comprises dynamically determining the at least one type of biometric based on the attribute of the data transfer.

13. The method of claim 10, comprising identifying a source device associated with the sender based on an identifier of the sender included in the authorization request message, wherein the receiving the biometric data comprises querying the source device for previously-stored biometric data of the at least one type of biometric which has been previously stored on the source device.

14. The method of claim 10, wherein the determining the at least one type of biometric comprises determining at least two types of biometrics to be provided in real time to verify the sender based on the details of the data transfer.

15. The method of claim 10, further comprising training an AI model with a neural network capability to determine the importance metric of the data transfer based on at least one of details of historical data transfers, importance metrics assigned to the historical data transfers, and model feedback data.

16. A non-transitory computer-readable storage medium comprising instructions which when executed by a computer cause a processor to perform:

receiving an authorization request message comprising details of a data transfer from a sender to a receiver;

executing an artificial intelligence (AI) model on the details of the data transfer to generate an importance metric of the data transfer;

determining at least one type of biometric to use for verification of the data transfer based on the importance metric;

receiving biometric data of the at least one type of biometric from the sender via a software application;

verifying an identity of the sender based on a comparison of the biometric data and baseline biometric data of the sender; and in response to successful verification, modifying the authorization request message to indicate successful verification, and transmitting the modified authorization request message to a downstream computing node to perform the data transfer.

17. The computer-readable storage medium of claim 16, wherein the modifying comprises adding a predefined code into a predefined field of the authorization request message to indicate the identity of the sender is verified, and the transmitting comprises transmitting the modified authorization request message to the computing node, wherein an artificial intelligence agent performs an action based on the modified authorization request message.

18. The non-transitory computer-readable storage medium of claim 16, further comprising reading the details of the data transfer from the authorization request message, and determining an attribute of the data transfer from the details, wherein the dynamically determining the at least one type of biometric data comprises dynamically determining the at least one type of biometric based on the attribute of the data transfer.

19. The non-transitory computer-readable storage medium of claim 16, comprising identifying a source device associated with the sender based on an identifier of the sender included in the authorization request message, wherein the receiving the biometric data comprises querying the source device for previously-stored biometric data of the at least one type of biometric which has been previously stored on the source device.

20. The non-transitory computer-readable storage medium of claim 16, further comprising training the AI model with a neural network capability to determine the importance metric of the data transfer based on at least one of details of historical data transfers, importance metrics assigned to the historical data transfers, and model feedback data.

* * * * *